United States Patent
Shiraki et al.

(10) Patent No.: US 8,331,713 B2
(45) Date of Patent: Dec. 11, 2012

(54) IMAGE PROCESSING APPARATUS, IMAGE PROCESSING METHOD, PROGRAM AND LEARNING APPARATUS

(75) Inventors: Hisakazu Shiraki, Kanagawa (JP); Tetsujiro Kondo, Tokyo (JP); Kenji Takahashi, Kanagawa (JP); Tsutomu Watanabe, Kanagawa (JP); Takahiro Nagano, Kanagawa (JP); Yasuhiro Suto, Tokyo (JP); Noriaki Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1035 days.

(21) Appl. No.: 12/331,815

(22) Filed: Dec. 10, 2008

(65) Prior Publication Data

US 2009/0161977 A1 Jun. 25, 2009

(30) Foreign Application Priority Data

Dec. 21, 2007 (JP) ................. 2007-330454

(51) Int. Cl.
G06K 9/40 (2006.01)
G03B 1/30 (2006.01)
G03B 27/52 (2006.01)
G03B 13/32 (2006.01)
H04N 5/232 (2006.01)

(52) U.S. Cl. ............. 382/255; 348/345; 355/55; 396/89
(58) Field of Classification Search .................. None
See application file for complete search history.

(56) References Cited

U.S. PATENT DOCUMENTS

| | | | | |
|---|---|---|---|---|
| 6,678,405 B1 * | 1/2004 | Kondo et al. | ................. | 382/159 |
| 6,898,327 B1 * | 5/2005 | Hrusecky et al. | ............. | 382/260 |
| 8,184,926 B2 * | 5/2012 | Sun et al. | ...................... | 382/275 |
| 2002/0080261 A1 | 6/2002 | Kitamura et al. | | |
| 2006/0140497 A1 * | 6/2006 | Kondo et al. | ................. | 382/254 |
| 2006/0146198 A1 * | 7/2006 | Kondo et al. | ................. | 348/627 |
| 2006/0147128 A1 * | 7/2006 | Kondo et al. | ................. | 382/300 |
| 2006/0159368 A1 * | 7/2006 | Kondo et al. | ................. | 382/299 |
| 2006/0233460 A1 * | 10/2006 | Kondo et al. | ................. | 382/276 |
| 2008/0008361 A1 * | 1/2008 | Nozaki et al. | ................. | 382/118 |
| 2008/0063294 A1 * | 3/2008 | Burt et al. | ..................... | 382/255 |
| 2009/0161976 A1 * | 6/2009 | Shiraki et al. | ................. | 382/255 |
| 2012/0113287 A1 * | 5/2012 | Johnson et al. | ............. | 348/222.1 |

FOREIGN PATENT DOCUMENTS

| | | |
|---|---|---|
| JP | 2000-348019 | 12/2000 |
| JP | 2001-331806 | 11/2001 |
| JP | 2002-77591 | 3/2002 |
| JP | 2007-206738 | 8/2007 |

OTHER PUBLICATIONS

Japanese Office Action issued Aug. 16, 2011. in Patent Application No. 2007-330454.

* cited by examiner

*Primary Examiner* — Randolph I Chu
(74) *Attorney, Agent, or Firm* — Oblon, Spivak, McClelland, Maier & Neustadt, L.L.P.

(57) ABSTRACT

An image processing apparatus includes: a blur removing processing section configured to carry out a blur removing process for an input image using a plurality of blur removal coefficients for removing blur of a plurality of different blur amounts to produce a plurality of different blur removal result images; a feature detection section configured to detect a feature from each of the different blur removal result images; a blur amount class determination section configured to determine blur amount classes representative of classes of the blur amounts from the features; and a prediction processing section configured to carry out mathematic operation of pixel values of predetermined pixels of the input image and prediction coefficients learned in advance and corresponding to the blur amount classes to produce an output image from which the blur is removed.

16 Claims, 26 Drawing Sheets

PIXEL OF INTEREST

PIXEL CORRESPONDING
TO PIXEL OF INTEREST

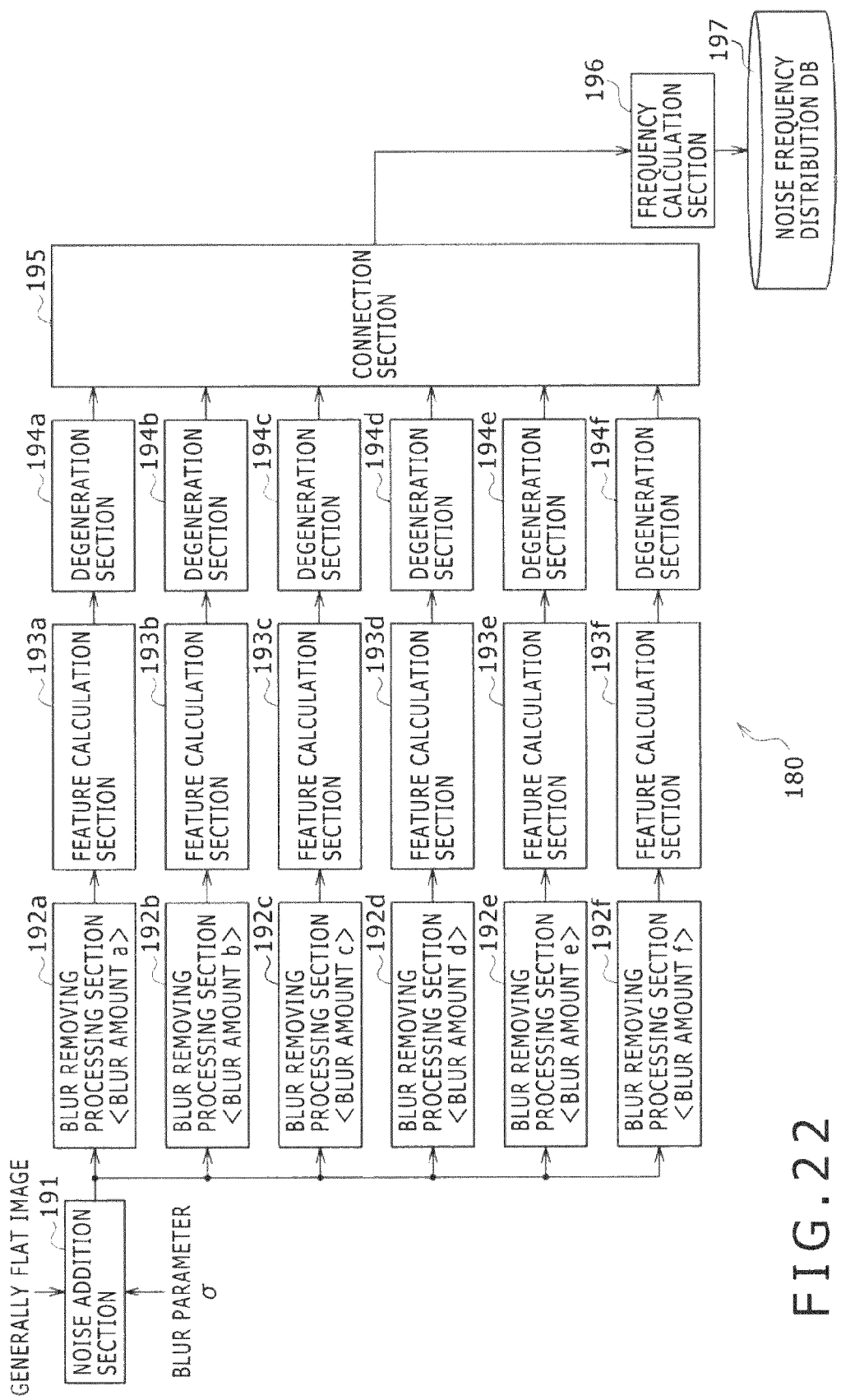
F I G. 22

INPUT IMAGE

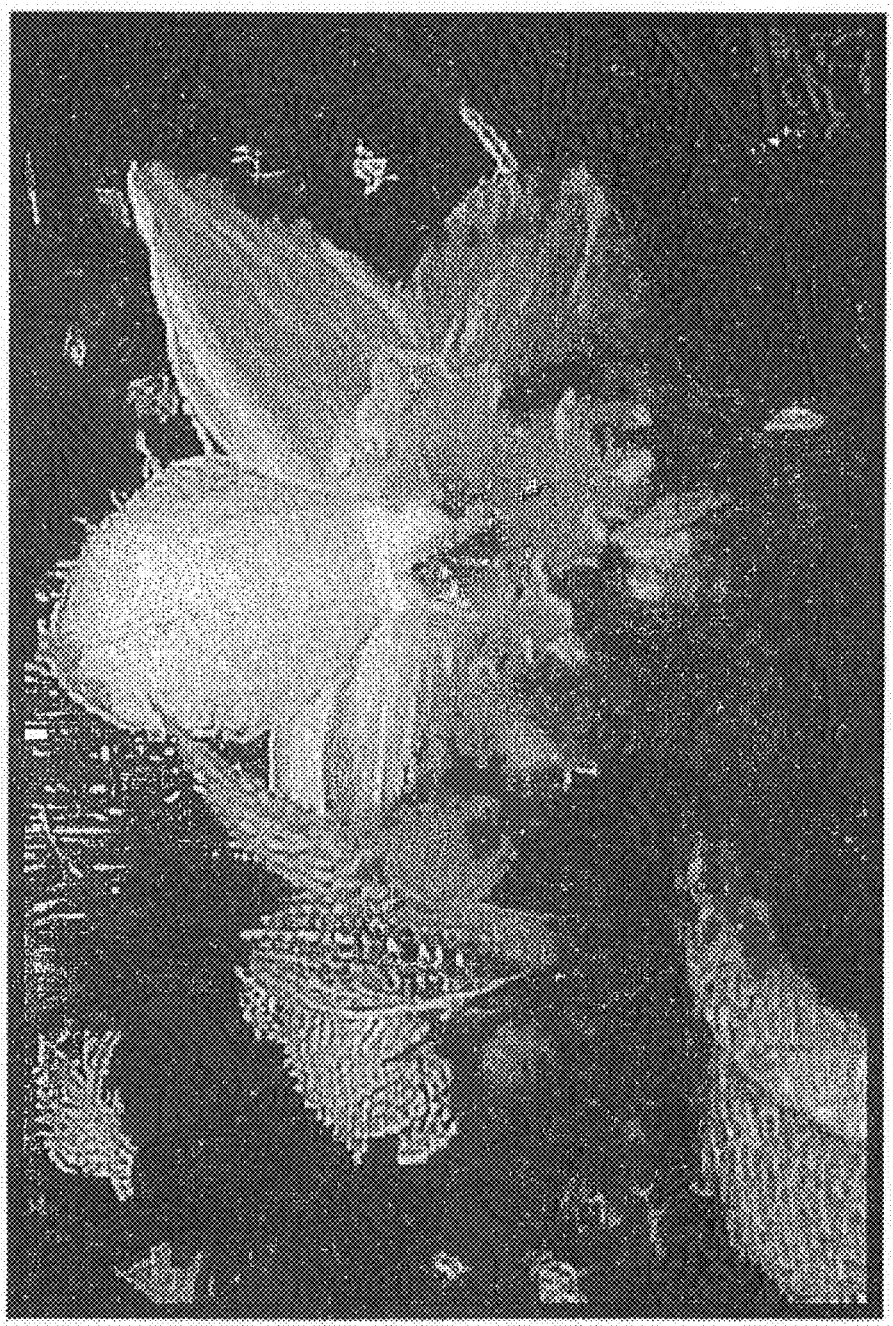
FIG. 27  IMAGE AFTER BLUR REMOVAL PROCESS BY MANUAL ADJUSTMENT

FIG. 28 IMAGE AFTER PROCESS PROPOSED TECHNIQUE

IMAGE PROCESSING APPARATUS, IMAGE PROCESSING METHOD, PROGRAM AND LEARNING APPARATUS

CROSS REFERENCES TO RELATED APPLICATIONS

The present invention contains subject matter related to Japanese Patent Application JP 2007-330454, filed in the Japan Patent Office on Dec. 21, 2007, the entire contents of which being incorporated herein by reference.

BACKGROUND OF THE INVENTION

1. Field of the Invention

This invention relates to an image processing apparatus, an image processing method, a program and a learning apparatus, and more particularly to an image processing apparatus, an image processing method, a program and a learning apparatus by which blur arising from a plurality of different image pickup objects at different distances included in an image can be removed.

2. Description of the Related Art

Various image processes for removing blur of an image have been proposed.

For example, a method is known wherein a plurality of images having different focal distances and individually focused on the foreground, the background and so forth are picked up and a blur control image on which the blur degrees of the image pickup objects on the foreground and the background are adjusted is produced. The method is disclosed, for example, in Japanese Patent Laid-Open No. 2002-77591 (hereinafter referred to as Patent Document 1).

Also another method is known wherein it is decided in a unit of a small block whether or not a focused state is established depending upon whether or not the gradient of an edge exceeds a predetermined threshold value. The threshold value is optimized taking the dispersion of the small blocks into consideration, and those small blocks determined to be in a focused state are connected to one another to extract a focused region. The method is disclosed, for example, in Japanese Patent Laid-Open No. 2001-331806 (hereinafter referred to as Patent Document 2).

SUMMARY OF THE INVENTION

However, with the method disclosed in Patent Document 1, it is presupposed to pick up a plurality of images in advance. Therefore, the method has a problem that the process cannot be applied to an image picked up already or an image transmitted by broadcasting.

Meanwhile, with the method disclosed in Patent Document 2, since it is decided whether or not each small block is in a focused state, decision regarding a plurality of different regions having different blur amounts in one screen image is not carried out. Thus, where a screen image is divided into a plurality of regions, a plurality of threshold values must be prepared. Therefore, the method has a problem that it is difficult to optimize the threshold value with a high degree of accuracy for each input image.

Therefore, it is demanded to provide an image processing apparatus, an image processing method, a program and a learning apparatus by which blur arising from a plurality of different image pickup objects at different distances included in an image can be removed optimally.

According to a first embodiment of the present invention, there is provided an image processing apparatus including a blur removing processing section configured to carry out a blur removing process for an input image using a plurality of blur removal coefficients for removing blur of a plurality of different blur amounts to produce a plurality of different blur removal result images. The apparatus further includes a feature detection section configured to detect a feature from each of the different blur removal result images, a blur amount class determination section configured to determine blur amount classes representative of classes of the blur amounts from the features, and a prediction processing section configured to carry out mathematic operation of pixel values of predetermined pixels of the input image and prediction coefficients learned in advance and corresponding to the blur amount classes to produce an output image from which the blur is removed.

The image processing apparatus may be configured such that the blur amount class determination section includes a blur amount generation probability storage section configured to detect features from the plural different blur removal result images obtained by removing, from blur images obtained by adding blur of the plural different blur amounts to the input image, the blur using the plural different blur removal coefficients to detect a frequency distribution of the features regarding each of the plural different blur amounts in advance and store, for each feature, a probability distribution representative of generation probabilities of the blur amounts. The blur amount class determination section determines that one of the blur amounts which exhibits the highest generation probability as a blur amount class from the probability distributions stored in the blur amount generation probability storage section with regard to the features detected by the feature detection section.

In this instance, the image processing apparatus may be further configured such that the feature detection section detects the features regarding each of a pixel of each of the blur removal result images corresponding to a pixel of interest and peripheral pixels around the pixel of interest, and the blur amount class determination section adds the generation probability of the blur amount corresponding to each of the features detected by the feature detection section among the same blur amounts and determines a blur amount class corresponding to the pixel of interest from a result of the addition.

Further, the image processing apparatus in this instance may be configured such that the blur amount class determination section further includes a noise information storage section configured to detect in advance the features from the plural different blur removal result images obtained by removing, from a noise addition image obtained by adding noise to a flat image, the blur using the plural blur removal coefficients to store information representative of the generation probabilities of the features by the noise. The blur amount class determination section does not carry out the addition of the generation probability of the blur amount of the feature which is generated with high possibility by the noise from among the features of the pixel of interest and the peripheral pixels around the pixel of interest.

The image processing apparatus may be configured such that the feature detection section compares the pixel value and the threshold value of a pixel of each of the blur removal result images corresponding to a pixel of interest and a plurality of pixels in a particular region around the pixel corresponding to the pixel of interest with each other and detects a feature for each of the blur amounts in response to a result of the comparison. The blur amount class determination section determines a blur amount class in response to a result of the detection of the feature detection section.

The image processing apparatus may be configured such that the feature detection section includes a first image characteristic detection section configured to detect a first image characteristic from a pixel of the input image corresponding to a pixel of interest and peripheral pixels around the pixel of interest. The feature detection section further includes a second image characteristic detection section configured to detect a second image characteristic from a pixel of each of the blur removal result images corresponding to the pixel of interest and peripheral pixels around the pixel of interest. The blur amount class determination section includes a feature property value storage section configured to classify a plurality of images in a unit of a pixel with the first image characteristic and detect and store a property value of the second image characteristic for each of the first image characteristics. The blur amount class determination section acquires the property value of the second image characteristic corresponding to the first image characteristic detected by the first image characteristic detection section from the feature property value storage section, whereafter the blur amount class determination section compares the second image characteristic detected by the second image characteristic detection section and the acquired property value with each other to determine a blur amount class.

According to the first embodiment, there is provided also an image processing method including a step of carrying out a blur removing process for an input image using a plurality of blur removal coefficients for removing blur of a plurality of different blur amounts to produce a plurality of different blur removal result images. The method further includes the steps of detecting a feature from each of the different blur removal result images, determining blur amount classes representative of classes of the blur amounts from the features, and carrying out mathematic operation of pixel values of predetermined pixels of the input image and prediction coefficients learned in advance and corresponding to the blur amount classes to produce an output image from which the blur is removed.

According to the present embodiment, there is further provided a program for causing a computer to execute an image process including a step of carrying out a blur removing process for an input image using a plurality of blur removal coefficients for removing blur of a plurality of different blur amounts to produce a plurality of different blur removal result images. The program for causing a computer to execute an image process further includes the steps of detecting a feature from each of the different blur removal result images, determining blur amount classes representative of classes of the blur amounts from the features, and carrying out mathematic operation of prediction coefficients learned in advance and corresponding to the blur amount classes and pixel values of predetermined pixels of the input image to produce an output image from which the blur is removed.

In the image processing apparatus and method and the program, a blur removing process for an input image is carried out using a plurality of blur removal coefficients for removing blur of a plurality of different blur amounts to produce a plurality of different blur removal result images. Then, blur amount classes representative of classes of the blur amounts are determined from features detected from the different blur removal result images. Then, mathematic operation of prediction coefficients learned in advance and corresponding to the blur amount classes and pixel values of predetermined pixels of the input image is carried out to produce an output image from which the blur is removed.

With the image processing apparatus and method and the program, blur arising from a plurality of different image pickup objects at different distances included in an image can be removed optimally.

According to a second embodiment of the present invention, there is provided a learning apparatus for learning a prediction coefficient used for an image processing apparatus which removes blur of an image. The learning apparatus includes a blur addition section configured to add blur to an input image inputted as a teacher image and has no blur to produce a student image, and a blur removing processing section configured to carry out a blur removing process for the student image using a plurality of blur removal coefficients for removing blur of a plurality of different blur amounts to produce a plurality of different blur removal result images. The learning apparatus further includes a feature detection section configured to detect a feature from each of the different blur removal result images, a blur amount class determination section configured to determine blur amount classes representative of classes of the blur amounts from the features, and a mathematic operation section configured to determine the prediction coefficient for each of the blur amount classes using the student image and the teacher image.

The learning apparatus may be configured such that the blur amount class determination section includes a blur amount generation probability storage section configured to detect features from the plural different blur removal result images obtained by removing, from blur images obtained by adding blur of the plural different blur amounts to the input image, the blur using the plural different blur removal coefficients to detect a frequency distribution of the features regarding each of the plural different blur amounts in advance and store, for each feature, a probability distribution representative of generation probabilities of the blur amounts. The blur amount class determination section determines that one of the blur amounts which exhibits the highest generation probability as a blur amount class from the probability distributions stored in the blur amount generation probability storage section with regard to the features detected by the feature detection section.

In this instance, the learning apparatus may be further configured such that the feature detection section detects the features regarding each of a pixel of each of the blur removal result images corresponding to a pixel of interest and peripheral pixels around the pixel of interest, and the blur amount class determination section adds the generation probability of the blur amount corresponding to each of the features detected by the feature detection section among the same blur amounts and determines a blur amount class corresponding to the pixel of interest from a result of the addition.

Further, the learning apparatus in this instance may be configured such that the blur amount class determination section further includes a noise information storage section configured to detect in advance the features from the plural different blur removal result images obtained by removing, from a noise addition image obtained by adding noise to a flat image, the blur using the plural blur removal coefficients to store information representative of the generation probabilities of the features by the noise. The blur amount class determination section does not carry out the addition of the generation probability of the blur amount of the feature which is generated with high possibility by the noise from among the features of the pixel of interest and the peripheral pixels around the pixel of interest.

The learning apparatus may be configured such that the feature detection section compares the pixel value and the threshold value of a pixel of each of the blur removal result images corresponding to a pixel of interest and a plurality of pixels in a particular region around the pixel corresponding to the pixel of interest with each other and detects a feature for each of the blur amounts in response to a result of the comparison, and the blur amount class determination section determines a blur amount class in response to a result of the detection of the feature detection section.

The learning apparatus may be configured such that the feature detection section includes a first image characteristic detection section configured to detect a first image characteristic from a pixel of the input image corresponding to a pixel of interest and peripheral pixels around the pixel of interest. In addition, the feature detection section includes a second image characteristic detection section configured to detect a second image characteristic from a pixel of each of the blur removal result images corresponding to the pixel of interest and peripheral pixels around the pixel of interest. The blur amount class determination section includes a feature property value storage section configured to classify a plurality of images in a unit of a pixel with the first image characteristic and detect and store a property value of the second image characteristic for each of the first image characteristics. The blur amount class determination section acquires the property value of the second image characteristic corresponding to the first image characteristic detected by the first image characteristic detection section from the feature property value storage section, whereafter the blur amount class determination section compares the second image characteristic detected by the second image characteristic detection section and the acquired property value with each other to determine a blur amount class.

In the learning apparatus, blur is added to an input image inputted as a teacher image and having no blur to produce a student image, and a blur removing process for the student image is carried out using a plurality of blur removal coefficients for removing blur of a plurality of different blur amounts to produce a plurality of different blur removal result images. Then, blur amount classes representative of classes of the blur amounts are determined from features detected from the different blur removal result images. Then, the prediction coefficient for each of the blur amount classes is determined using the student image and the teacher image.

With the learning apparatus, a prediction coefficient for use in an image processing apparatus which optimally removes blur arising from a plurality of different image pickup objects at different distances included in an image can be determined.

BRIEF DESCRIPTION OF THE DRAWINGS

FIG. 22 is a block diagram showing an example of a configuration of a noise database production section of the third form of the blur amount class production section;

FIGS. 26, 27 and 28 are schematic views illustrating an effect of a process by the image processing apparatus of FIG. 1.

DETAILED DESCRIPTION OF THE PREFERRED EMBODIMENT

Figure 1:
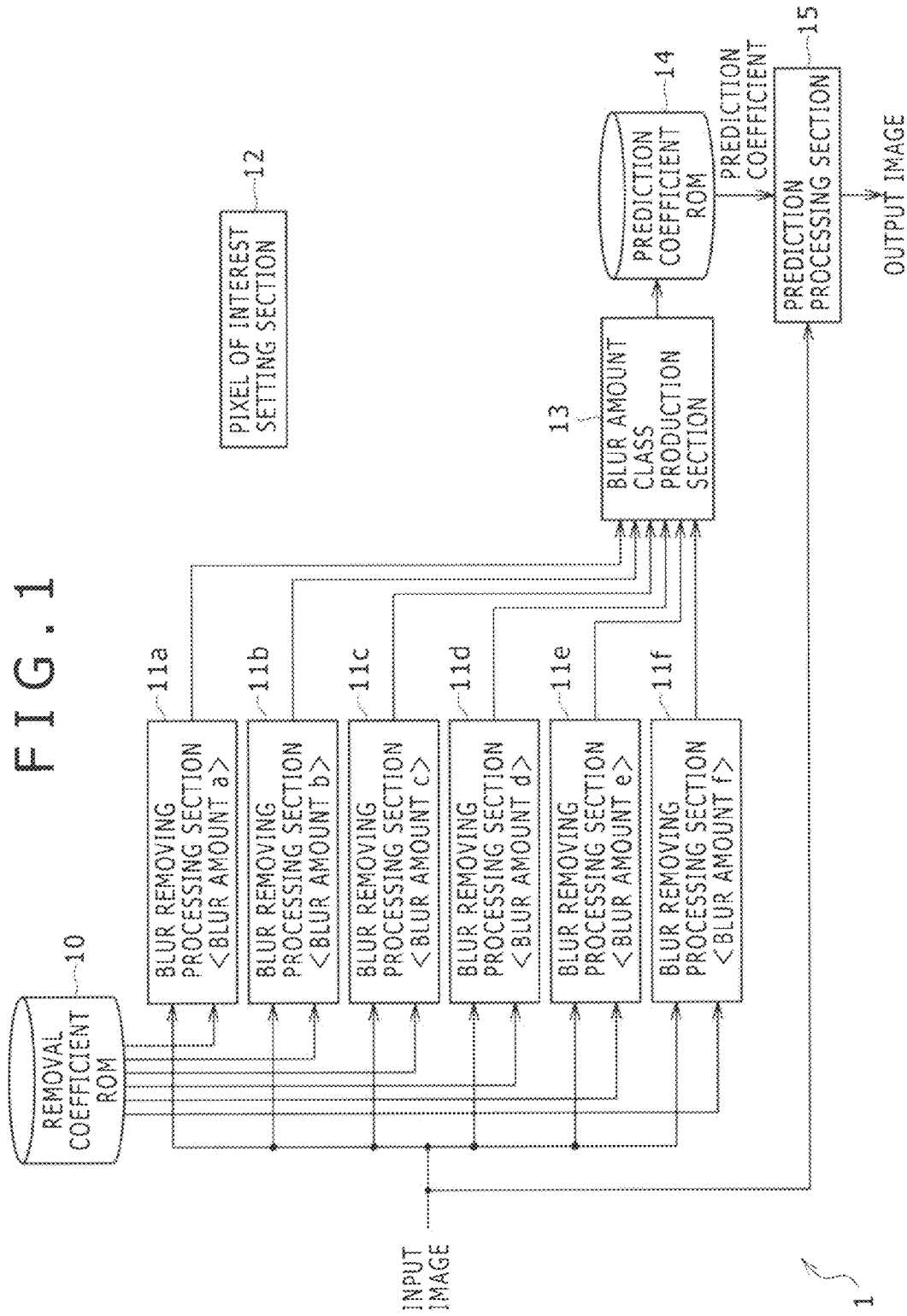
FIG. 1 is a block diagram showing an example of a configuration of an image processing apparatus to which the present invention is applied.

Referring first to FIG. 1, there is shown an example of a configuration of an image processing apparatus to which the present invention is applied.

The image processing apparatus 1 shown includes a removal coefficient ROM 10, blur removing processing sections 11a to 11f, a pixel of interest setting section 12, a blur amount class production section 13, a prediction coefficient ROM 14, and a prediction processing section 15.

The image processing apparatus 1 receives, as an input image thereto, an image having a plurality of object regions having different blur amounts from each other in accordance with the distance between an image pickup object and a camera. The image processing apparatus 1 outputs the image from which the blur of the input image is removed as an output image.

Figure 2:
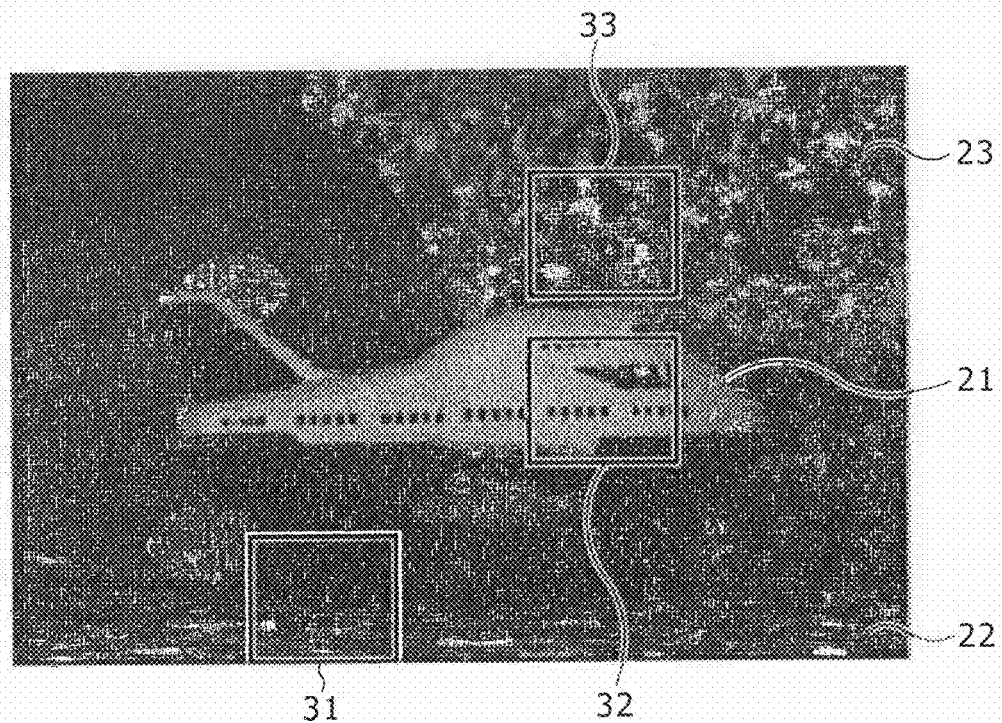
FIG. 2 is a schematic view showing an example of an input image.

FIG. 2 shows an example of the input image to be inputted to the image processing apparatus 1.

The image shown in FIG. 2, that is, the input image, is obtained by picking up an image of a toy airplane 21 (hereinafter referred to merely as airplane 21) placed on a predetermined flat face 22 by means of a camera. If, for example, a partial region 31 of the flat face 22, a partial region 32 of the airplane 21, and a partial region 33 of the background 23 of the airplane 21 of the image shown in FIG. 2 are noticed, then the distance between an included image pickup object and the camera is different among the regions 31 to 33. Thus, the image having such a plurality of object regions having different blur amounts in accordance with the distance between the image pickup object and the camera as just described is inputted as an image of a processing object of the image processing apparatus 1.

Referring back to FIG. 1, the removal coefficient ROM 10 stores blur removing coefficients to be individually used by the blur removing processing sections 11a to 11f. It is to be noted that the blur removing coefficient is different among the blur removing processing sections 11a to 11f.

The blur removing processing sections 11a to 11f supply a blur removal result image (hereinafter referred to simply as blur removal image), which is a result of a blur removing process for removing a predetermined amount of blur applied to the input image, to the blur amount class production section 13. The blur removing processing sections 11a to 11f use different blur amounts when they apply the blur removing process to the input image. For example, the blur removing processing section 11a carries out a blur removing process for removing an amount a of blur to the input image, and the blur removing processing section 11b carries out a blur removing process of removing another amount b of blur to the input image. The amount of blur removed by the blur removing processing sections 11c to 11f similarly is blur amounts c to f, respectively, and it is assumed that the blur amounts a to f, for example, decrease in this order, that is, in the order of a, b, c, d, e, and f.

The blur removing processing section 11a successively sets the pixels of the input image as a pixel of interest and extracts pixels, that is, pixel values of pixels, within a predetermined region with respect to the pixel of interest as a prediction tap. Further, the blur removing processing section 11a extracts pixels, that is, pixel values of pixels, in the predetermined region with respect to the pixel of interest as a class tap for classifying the pixel of interest into a predetermined class. The class tap and the prediction tap may be same as or different from each other. Further, the blur removing processing section 11a acquires a blur removal coefficient for the blur amount a corresponding to a class code determined from the class tap from the removal coefficient ROM 10. Then, the blur removing processing section 11a carries out product sum mathematic operation of the pixel values of the pixels which form the prediction tap and the blur removing coefficient for the blur amount a acquired from the removal coefficient ROM 10 to determine the pixel amount of the pixel of interest when the blur of the blur amount a is removed.

Where the pixel value of the pixels which form the prediction tap is represented by $x_1$ to $x_N$ and the blur removal coefficient for the blur amount a of the predetermined class supplied from the removal coefficient ROM 10 is represented by $w_1$ to $w_N$, the product sum mathematic operation for determining the pixel value y of the pixel of interest when the blur of the blur amount a is removed can be represented by the following expression (1):

$$y = w_1 x_1 + w_2 x_2 + \ldots + w_N x_N \tag{1}$$

Also the blur removing processing sections 11b to 11f carry out processing similar to that by the blur removing processing section 11a except that the blur amount is different. In particular, the blur removing processing sections 11b to 11f individually acquire the blur removal coefficients for the blur removing processing section 11b to 11f, respectively, from the removal coefficient ROM 10 and carry out the product sum mathematic operation of the blur removal coefficients and the pixel values of the individual prediction taps.

The pixel of interest setting section 12 successively sets each of the pixels which form the output image as a pixel of interest. The blur amount class production section 13, prediction coefficient ROM 14 and prediction processing section 15 carry out respective processes for the pixel of interest set by the pixel of interest setting section 12. Where the blur amount class production section 13 carries out a predetermined process for the pixel of interest, since the blur removal image must be outputted from the blur removing processing sections 11a to 11f, the above-described pixels of interest set in the blur removing processing sections 11a to 11f and the pixel of interest set by the pixel of interest setting section 12 are different from or independently of each other. In the following description, the term pixel of interest represents the pixel of interest set by the pixel of interest setting section 12.

The blur amount class production section 13 uses the blur removal images individually supplied from the blur removing processing sections 11a to 11f to classify the blur amount of each pixel of interest into a predetermined class and supplies a resulting blur amount class code to the prediction coefficient ROM 14. How the blur amount class production section 13 calculates a blur amount class code representative of a blur amount of a pixel of interest is hereinafter described with reference to figures beginning with FIG. 6.

The prediction coefficient ROM 14 stores prediction coefficients corresponding to the individual blur amount classes determined by a prediction coefficient learning apparatus 221 hereinafter described with reference to FIG. 24. Then, if a predetermined blur amount class code is supplied from the blur amount class production section 13 to the prediction coefficient ROM 14, then the prediction coefficient ROM 14 supplies a prediction coefficient corresponding to the blur amount class code to the prediction processing section 15.

The prediction processing section 15 sets a predetermined region with respect to the pixel of interest as a prediction tap range and calculates, setting each of the pixels of the input image included in the set prediction tap range as a prediction tap, the pixel value of the pixel of interest, which forms an output image, by product sum mathematic operation of the pixel value of the prediction tap and a prediction coefficient.

Now, a production method of the blur removal coefficients stored in the removal coefficient ROM 10 is described.

Figure 3:
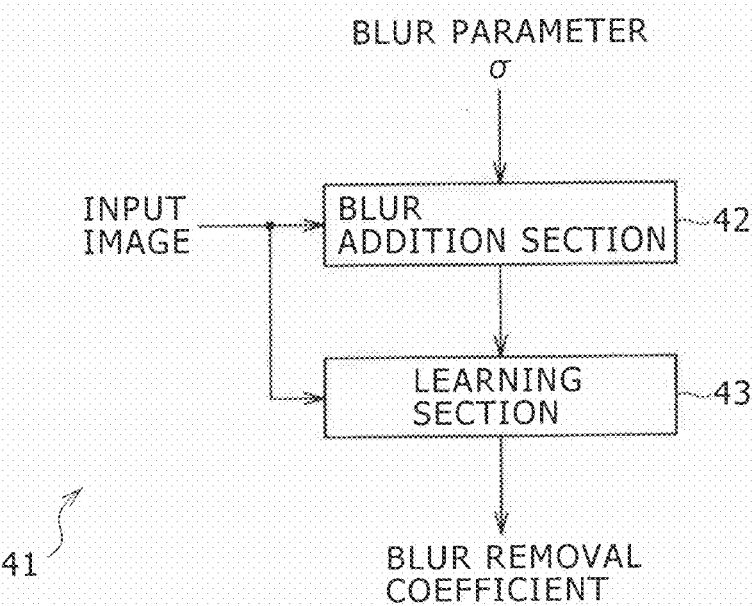
FIG. 3 is a block diagram showing an example of a configuration of a blur removal coefficient learning apparatus.

FIG. 3 shows an example of a configuration of a blur removal coefficient learning apparatus 41 for determining a blur removal coefficient to be stored into the removal coefficient ROM 10.

Referring to FIG. 3, the blur removal coefficient learning apparatus 41 shown includes a blur addition section 42 and a learning section 43.

An image having no blur is inputted as a teacher image or input image to the blur removal coefficient learning apparatus 41 and supplied to the blur addition section 42 and the learning section 43.

The blur addition section 42 artificially adds blur to the input image to produce an image having blur thereon and supplies the produced image as a student image to the learning section 43. In particular, the blur addition section 42 produces a student image in accordance with the following expression (2):

$$Y(x, y) = \sum_{i,j} W(i, j) \times X(x+i, y+j) \quad (2)$$

where X(x+i, y+j) represents the pixel value of a teacher image at the coordinates X(x+i, y+j) with which no blur appears, and by convoluting values obtained by multiplying such pixel values X(x+i, y+j) with the weighting coefficients W(i, j), a pixel value Y(x, y) of a student image with which blur appears is produced. The weighting coefficient W(i, j) is a Gaussian function which represents blur by an out-of-focus state of a lens as given by the following expression (3):

$$W(i, j) = \frac{1}{2\pi\sigma^2} e^{\frac{i^2+j^2}{-2\sigma^2}} \quad (3)$$

where the parameter σ corresponds to blur, and as the value of the parameter σ increases, also the blur increases. On the contrary, as the value of the parameter σ decreases, the blur decreases.

According to the expressions (2) and (3), the pixel value of the pixel of interest after addition of blur is determined by integrating pixel values diffused from a pixel at a position whose x coordinate is x+i and whose y coordinate is y+j to a pixel of interest at a position whose x coordinate is x and whose y coordinate is y.

The learning section 43 sets up a normal equation using an input image as a teacher image and using an image supplied from the blur addition section 42 as a student image and carries out a learning process by the least square method to calculate a blur removal coefficient. In the following, a determination method of a blur removal coefficient wherein a normal equation is set up and solved is described briefly. It is to be noted that also the determination method of a prediction coefficient which the prediction processing section 15 acquires from the prediction coefficient ROM 14 and uses for the product sum mathematic operation with the pixel values of the prediction tap is similar to this.

The expression (1) given hereinabove can be represented by the following expression (1'):

$$y = \sum_{n=1}^{N} w_n x_n \quad (1')$$

where $x_n$ is a pixel value of an nth pixel (hereinafter referred to suitably as low picture quality pixel) of a student image to which blur is added and which forms a prediction tap regarding a pixel (hereinafter referred to suitably as high picture quality pixel) y of a teacher image having no blur, and $w_n$ is an nth blur removal coefficient or prediction coefficient to be multiplied by the pixel value of the nth low picture quality pixel.

Now, if the true value of the pixel value of the high picture quality pixel of the kth sample is represented by $y_k$ and the prediction value of the true value $y_k$ obtained based on the expression (1') is represented by $y_k'$, then the prediction error $e_k$ of the prediction value $y_k'$ is represented by the following expression (4):

$$e_k = y_k - y_k' \quad (4)$$

Since the prediction value $y_k'$ of the expression (4) is determined in accordance with the expression (1'), if $y_k'$ of the expression (4) is replaced in accordance with the expression (1'), then the following expression (5) is obtained:

$$e_k = y_k - \left(\sum_{n=1}^{N} w_n x_{n,k}\right) \quad (5)$$

where $x_{n,k}$ is the nth low picture quality pixel which forms a prediction tap regarding the high picture quality pixel of the kth sample.

Although the blur removal coefficient $w_n$ with which the prediction error $e_k$ of the expression (5) (or the expression (4)) becomes 0 is optimum for prediction of the high picture quality pixel, it is generally difficult to determine such a removal coefficient $w_n$ for all of the high picture quality pixels.

Therefore, if, for example, the least squire method is adopted as a model representing that the blur removal coefficient $w_n$ is optimum, then the optimum blur removal coefficient $w_n$ can be determined by minimizing the sum total E of the square error represented by the following expression (6):

$$E = \sum_{k=1}^{K} e_k^2 \quad (6)$$

where K is the number of samples, that is, the number of samples for learning, of a set of the high quality pixel $y_k$ and the low quality pixels $x_{1,k}, x_{2,k}, \ldots, x_{N,k}$ which form a prediction tap regarding the high quality pixel $y_k$.

The minimum value of the sum total E of the square errors of the expression (6) is given by the blur removal coefficient $w_n$ with which a result of partial differentiation by the blur removal coefficient $w_n$ becomes 0 as given by the expression (7):

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \quad (7)$$

$$(n = 1, 2, \ldots, N)$$

Therefore, if the expression (5) given hereinabove is partially differentiated by the removal coefficient $w_n$, then the following expression (8) is obtained:

$$\frac{\partial e_k}{\partial w_1} = -X_{1,k}, \quad \frac{\partial e_k}{\partial w_2} = -X_{2,k}, \ldots, \frac{\partial e_k}{\partial w_N} = -X_{N,k} \quad (8)$$

$$(k = 1, 2, \ldots, K)$$

The following expression (9) is obtained from the expressions (7) and (8):

$$\sum_{k=1}^{K} e_k X_{1,k} = 0, \quad \sum_{k=1}^{K} e_k X_{2,k} = 0, \ldots \sum_{k=1}^{K} e_k X_{N,k} = 0 \quad (9)$$

By substituting the expression (5) into $e_k$ of the expression (9), the expression (9) can be represented by a normal equation given by the following expression (10):

$$\begin{bmatrix} \left(\sum_{k=1}^{K} X_{1,k}X_{1,k}\right) & \left(\sum_{k=1}^{K} X_{1,k}X_{2,k}\right) & \cdots & \left(\sum_{k=1}^{K} X_{1,k}X_{N,k}\right) \\ \left(\sum_{k=1}^{K} X_{2,k}X_{1,k}\right) & \left(\sum_{k=1}^{K} X_{2,k}X_{2,k}\right) & \cdots & \left(\sum_{k=1}^{K} X_{2,k}X_{N,k}\right) \\ \vdots & \vdots & \ddots & \vdots \\ \left(\sum_{k=1}^{K} X_{N,k}X_{1,k}\right) & \left(\sum_{k=1}^{K} X_{N,k}X_{2,k}\right) & \cdots & \left(\sum_{k=1}^{K} X_{N,k}X_{N,k}\right) \end{bmatrix} \begin{bmatrix} w_1 \\ w_2 \\ \vdots \\ w_N \end{bmatrix} = \begin{bmatrix} \left(\sum_{k=1}^{K} X_{1,k}Y_k\right) \\ \left(\sum_{k=1}^{K} X_{2,k}Y_k\right) \\ \vdots \\ \left(\sum_{k=1}^{K} X_{N,k}Y_k\right) \end{bmatrix} \quad (10)$$

The normal equation of the expression (10) can be solved for the blur removal coefficient $w_n$, for example, by using a sweeping out method (process of elimination of Gauss-Jordan) or a like method.

By setting up and solving the normal equation of the expression (10) for each class, an optimum blur removal coefficient $w_n$, here, a blur removal coefficient which minimizes the sum total E of the square errors, can be determined for each class. The blur removal coefficients determined in such a manner as described above are stored in the removal coefficient ROM 10.

Here, it is assumed that the blur removal coefficients stored in the removal coefficient ROM 10 are those where the parameter σ is set to σ=, 0.3, 0.6, 1.2, 1.8, 2.4, 2.7. In particular, the blur removing processing section 11a carries out a blur removing process corresponding to the parameter σ=0.3; the blur removing processing section 11b carries out the process corresponding to the parameter σ=0.6; the blur removing processing section 11c carries out the process corresponding to the parameter σ=1.2; the blur removing processing section 11d carries out the process corresponding to the parameter σ=1.8; the blur removing processing section 11e carries out the process corresponding to the parameter σ=2.4; and the blur removing processing section 11f carries out the process corresponding to the parameter σ=2.7.

Figure 4:
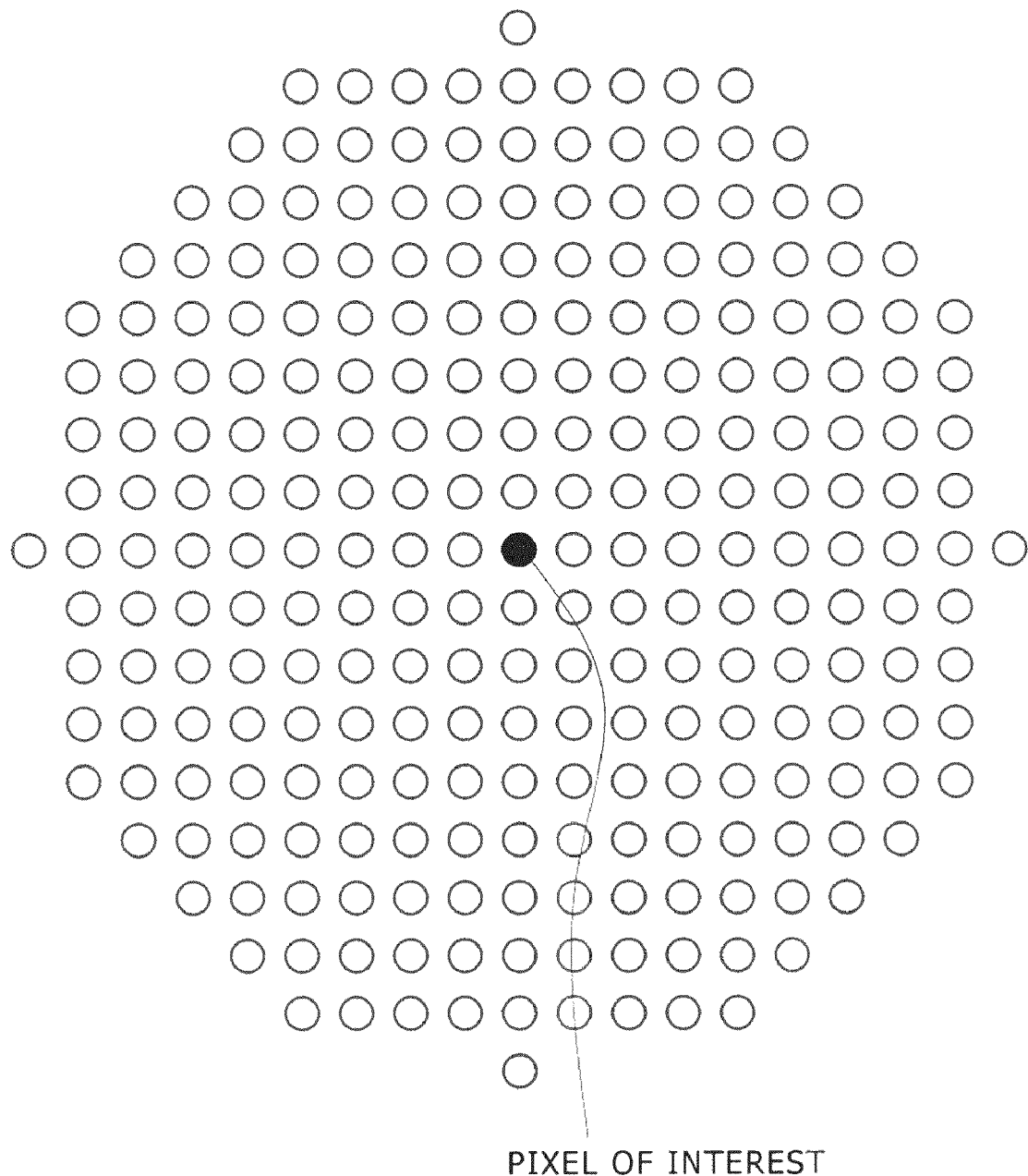
FIG. 4 is a diagrammatic view illustrating an example of a prediction tap set for a pixel of interest.

FIG. 4 illustrates an example of a prediction tap set to a pixel of interest by the prediction processing section 15.

The prediction processing section 15 determines a prediction tap range depending upon the blur parameter $\sigma_{max}$ which is maximum among the blur parameters σ used in the learning, in the example above, the parameter $\sigma_{max}$=2.7. More particularly, The prediction processing section 15 determines the range within a circle having the center at the pixel of interest and having a radius of $3\times\sigma_{max}$ as a prediction tap range. This is because, in order to obtain a sufficient blur removal result for a region which exhibits blur of $\sigma_{max}$, a prediction tap of such a size as a radius of $3\times\sigma_{max}$ is required. For example, FIG. 4 illustrates a prediction tap where the parameter $\sigma_{max}$ is set to $\sigma_{max}$.

Figure 5:
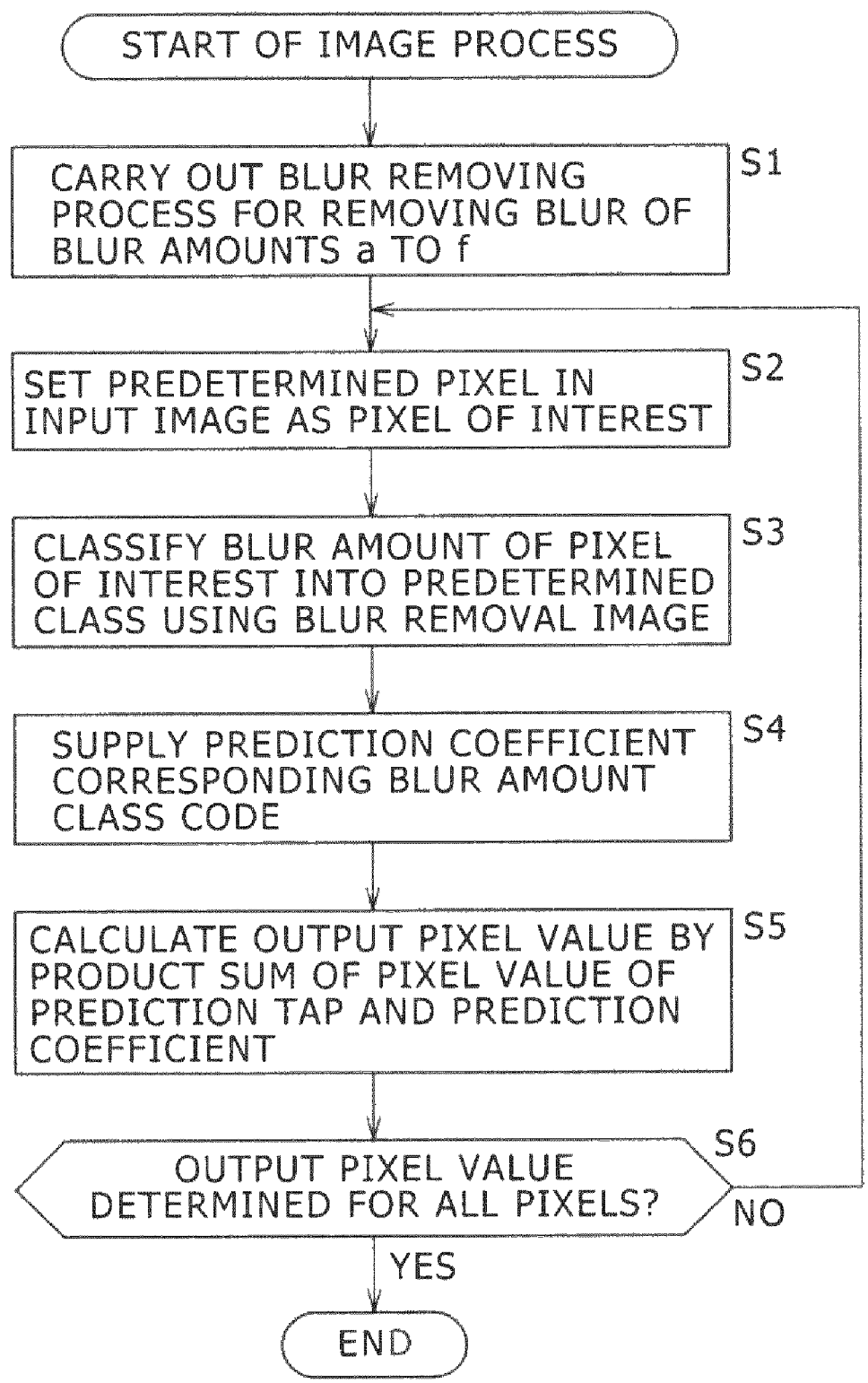
FIG. 5 is a flow chart illustrating an image process by the image processing apparatus of FIG. 1.

An image process, that is, a blur removing process, by the image processing apparatus 1 of FIG. 1 is described with reference to FIG. 5.

First at step S1, the blur removing processing sections 11a to 11f individually carry out a blur removing process for removing blur of the blur amounts a to f for the input image and supply a blur removal image corresponding to the blur amounts a to f to the blur amount class production section 13.

At step S2, the pixel of interest setting section 12 sets a predetermined pixel of the output image as a pixel of interest.

At step S3, the blur amount class production section 13 uses the blur removal images supplied from the blur removing processing sections 11a to 11f to classify the blur amount of the pixel of interest into a predetermined class and supplies a resulting blur amount class code to the prediction coefficient ROM 14.

At step S4, the prediction coefficient ROM 14 supplies a prediction coefficient corresponding to the blur amount class code supplied thereto from the blur amount class production section 13 to the prediction processing section 15.

At step S5, the prediction processing section 15 carries out product sum mathematic operation of the pixel values of the prediction tap and the prediction coefficient to calculate the pixel value or output pixel value of the pixel of interest which forms an output image.

At step S6, the prediction processing section 15 decides whether or not the output pixel value is determined for all of the pixels of the output image. If it is decided at step S6 that the output pixel value is not determined for all pixels of the output image, then the processing returns to step S2 so that the processes at the steps beginning with step S2 are executed again. In particular, a pixel with regard to which no output pixel value is determined as yet is set as a pixel of interest and then an output pixel value is determined.

On the other hand, if it is decided at step S6 that the output pixel value is determined for all pixels of the output image, then the processing is ended.

As described above, the image processing apparatus 1 classifies the blur amount of each of the pixels of the input image into a predetermined class based on a result of a blur removal process of the input image carried out with various blur amounts, and then carries out product sum mathematic operation using a prediction coefficient determined based on the classified blur amount class code to produce an output image or output pixel values from which blur is removed.

The classification method of a blur amount class by the blur amount class production section 13 may be achieved adopting various methods, and various forms of the blur amount class production section 13 are described below.

First, a first form of the blur amount class production section 13 is described.

Figure 6:
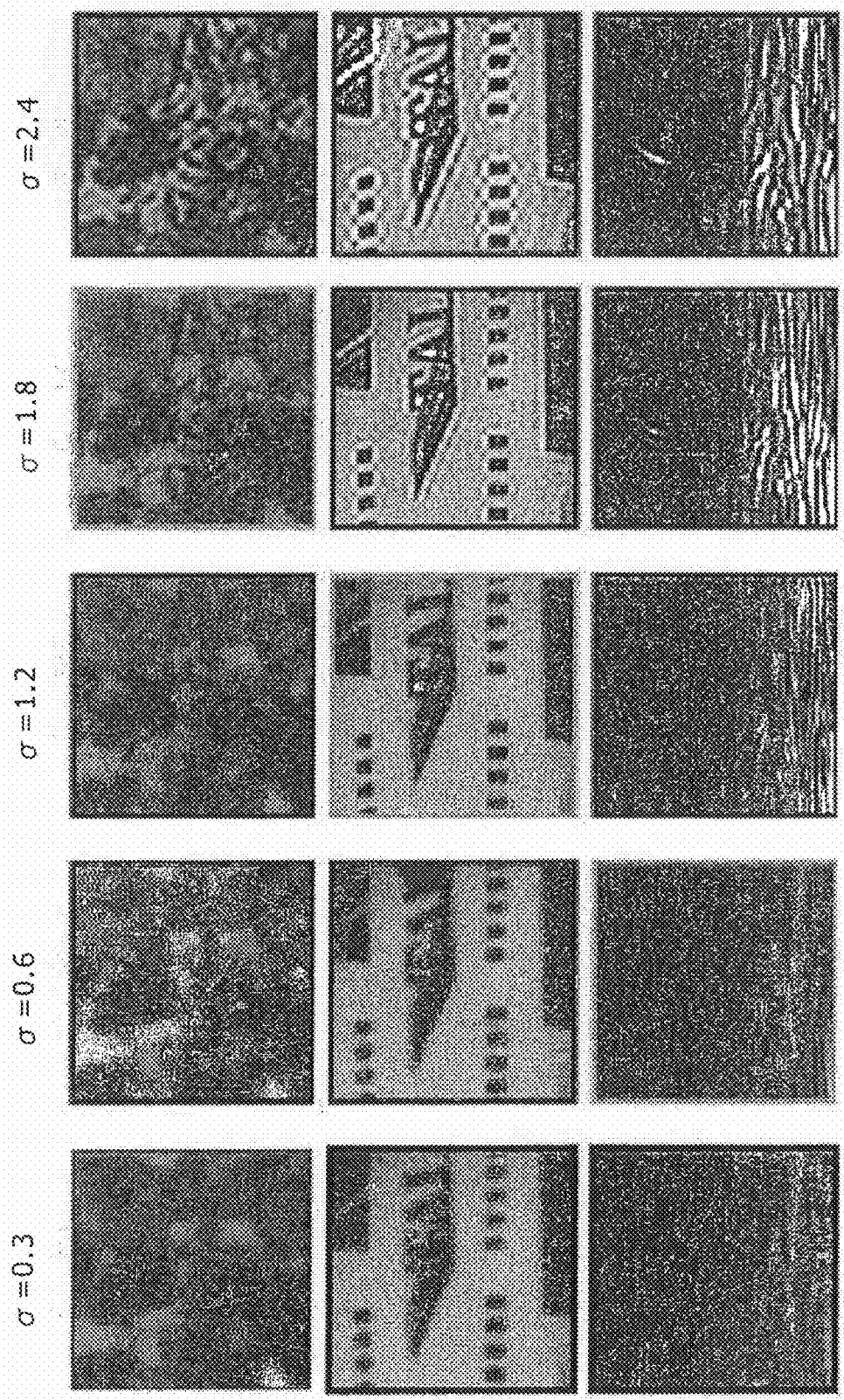
FIG. 6 is a schematic view showing examples of a blur removal image.

FIG. 6 shows blur removal images of the regions 31 to 33 after the input image of FIG. 2 is processed by a blur removal process by the blur removing processing sections 11a to 11f with the blur parameter σ=0.3, 0.6, 1.2, 1.8, 2.4, respectively.

Referring to FIG. 6, the upper stage shows blur removal images of the region 33 and the middle stage shows blur removal images of the region 32 while the lower stage shows blur removal images of the region 31.

The image pickup object in the region 33 is positioned remotest among the regions 31 to 33 from the camera, and from among blur removal results, the blur removal image corresponding to the parameter σ=1.8 from among the five different parameters u is the best.

Meanwhile, the image pickup object in the region 31 is positioned nearest among the regions 31 to 33 from the camera, and from among blur removal results, the blur removal image corresponding to the parameter σ=0.6 from among the five different parameters σ is the best.

On the other hand, the image pickup object in the region 32 is positioned intermediately between the image pickup objects in the regions 31 to 33, and from among blur removal results, the blur removal image corresponding to the parameter σ=1.2 from among the five different parameters σ is the best.

Accordingly, it can be recognized that the blur removal parameter which is considered optimum differs depending upon the degree of blur in each region in the input image.

Further, from the blur removal images shown in FIG. 6, those blur removal images from which blur is removed with the parameter σ exceeding a blur amount discriminated as a good blur amount suffers from a failure in that intense ringing appears therewith. For example, in the region 33, a failure is observed on the blur removal image of the parameter σ=2.4; in the region 32, a failure is observed on the blur removal image of the parameter σ=1.8; and in the region 31, a failure is observed on the blur removal image of the parameter σ=1.2.

Accordingly, it is considered that, where the parameter σ is gradually increased to carry out a blur removing process, also the parameter with which a failure occurs first differs depending upon the degree of the blur of each pixel in the input image.

Here, the blur amount class production section 13 of the first form (hereinafter referred to as blur amount class production section $13_1$) calculates a blur amount class code representative of a blur amount of a pixel of interest by detecting a blur removal image with which a failure occurs first.

In particular, the blur amount class production section $13_1$ sets such a circular region as seen in FIG. 4 which is centered at a pixel of interest and counts the number of pixels in the region which satisfy the following expression (11):

$$|Z(x,y) - \text{Offset}(x,y)| \geq \text{threshold} \quad (11)$$

where $Z(x, y)$ is a pixel value of the pixel $(x, y)$ of the blur removal image, and Offset$(x, y)$ and threshold can be set, for example, as Offset$(x, y)$=0 and threshold=255, respectively. The method is hereinafter referred to as first counting method of the first form. In this instance, it is signified that the blur amount class production section $13_1$ counts the number of pixels of the blur removal image which exceeds the upper limit 255 to the luminance level of the input image.

Or, in the expression (11), for example, Offset$(x, y)$ can be set as a pixel value of the input image, and threshold can be set as a predetermined value (hereinafter referred to as second counting method of the first form). In this instance, it is signified that the blur amount class production section $13_1$ counts the number of those pixels which exhibit a great variation (higher than threshold) of the pixel value of the blur removal image from the input image. The value of threshold is set to an optimum value by an experiment in advance.

Figure 7:
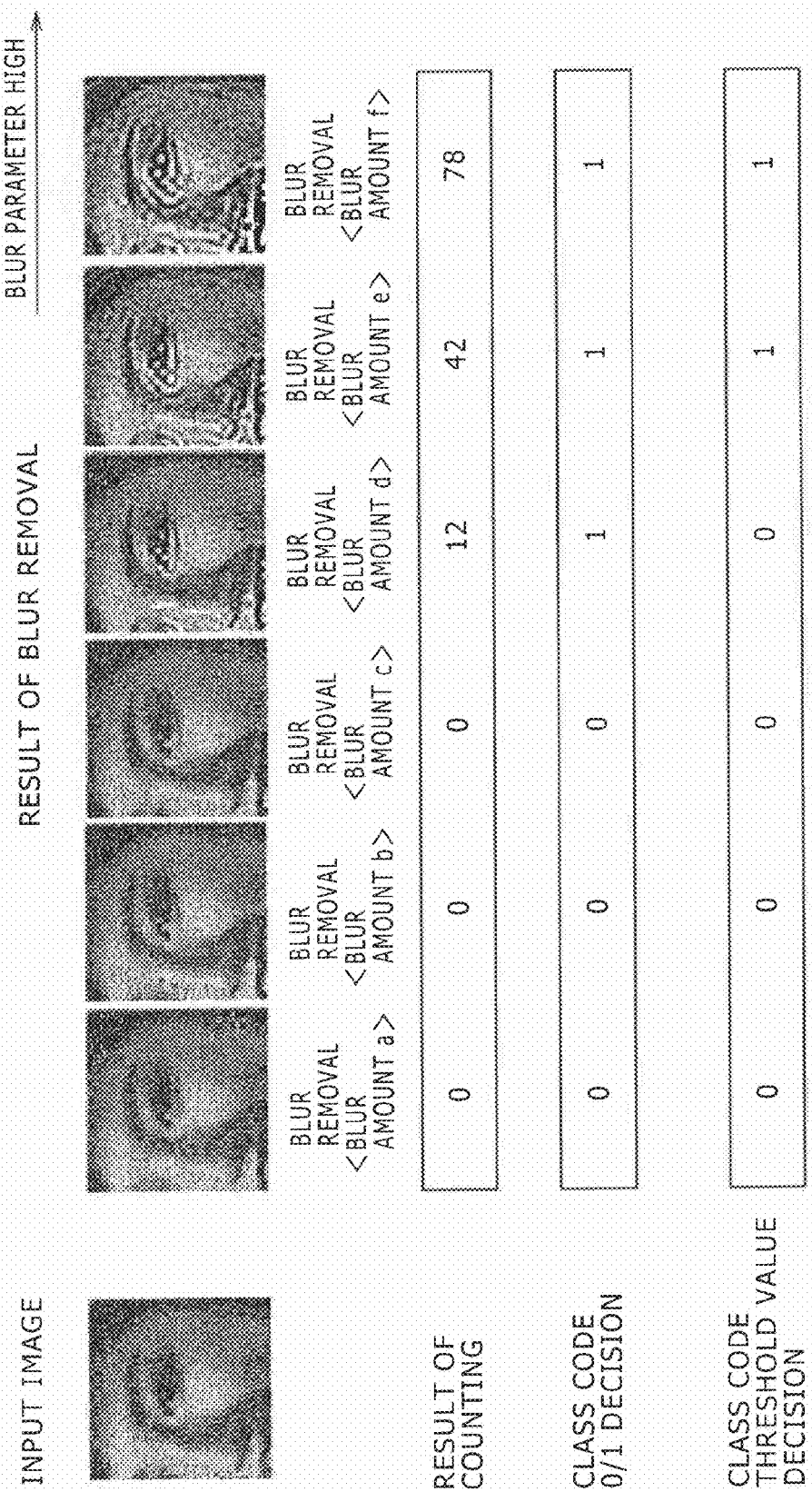
FIG. 7 is a schematic diagrammatic view illustrating a first form of a blur amount class production section.

FIG. 7 illustrates results of counting by the first or second counting method described above.

The blur amount class production section $13_1$ produces a blur amount class code based on the counting result by the first or second counting method.

For example, if the counting result is "0," then the blur amount class production section $13_1$ allocates a code of "0," but if the counting result is "any value other than 0," then the blur amount class production section $13_1$ allocates another code of "1" to produce a degenerated blur amount class code. This decision method is hereinafter referred to as first decision method of the first form.

The "class code 0/1 decision" in FIG. 7 indicates a blur amount class code produced by the first decision method corresponding to the "counting result" illustrated in FIG. 7.

Or, if the counting result is higher than an intermediate value between a maximum value and a minimum value thereof, that is, higher than ((maximum value−minimum value)/2), then the blur amount class production section $13_1$ may allocate a code of "1," but if the counting result is lower than the intermediate value, then the blur amount class production section $13_1$ may allocate another code of "0," to produce a degenerated blur amount class code. This decision method is hereinafter referred to as second decision method of the first form.

The "class code threshold value decision" in FIG. 7 indicates the blur amount class code produced by the second decision method corresponding to the "counting result" illustrated in FIG. 7.

It is to be noted that also it is possible to adopt some other decision method than the first and second decision methods described above. For example, depending upon whether the blur amount of the input image is great or small, the difference DR=(maximum value−minimum value) between the maximum value and the minimum value of the counting result differs. In particular, where the blur amount of the input image is small, a failure is likely to occur and the difference DR between the maximum value and the minimum value is great. On the contrary, where the blur amount of the input image is great, the difference DR between the maximum value and the minimum value is small. Therefore, the value of the difference DR between the maximum value and the minimum value may be added as a blur amount class. This makes it easier to distinguish the blur amount of the input image.

Figure 8:
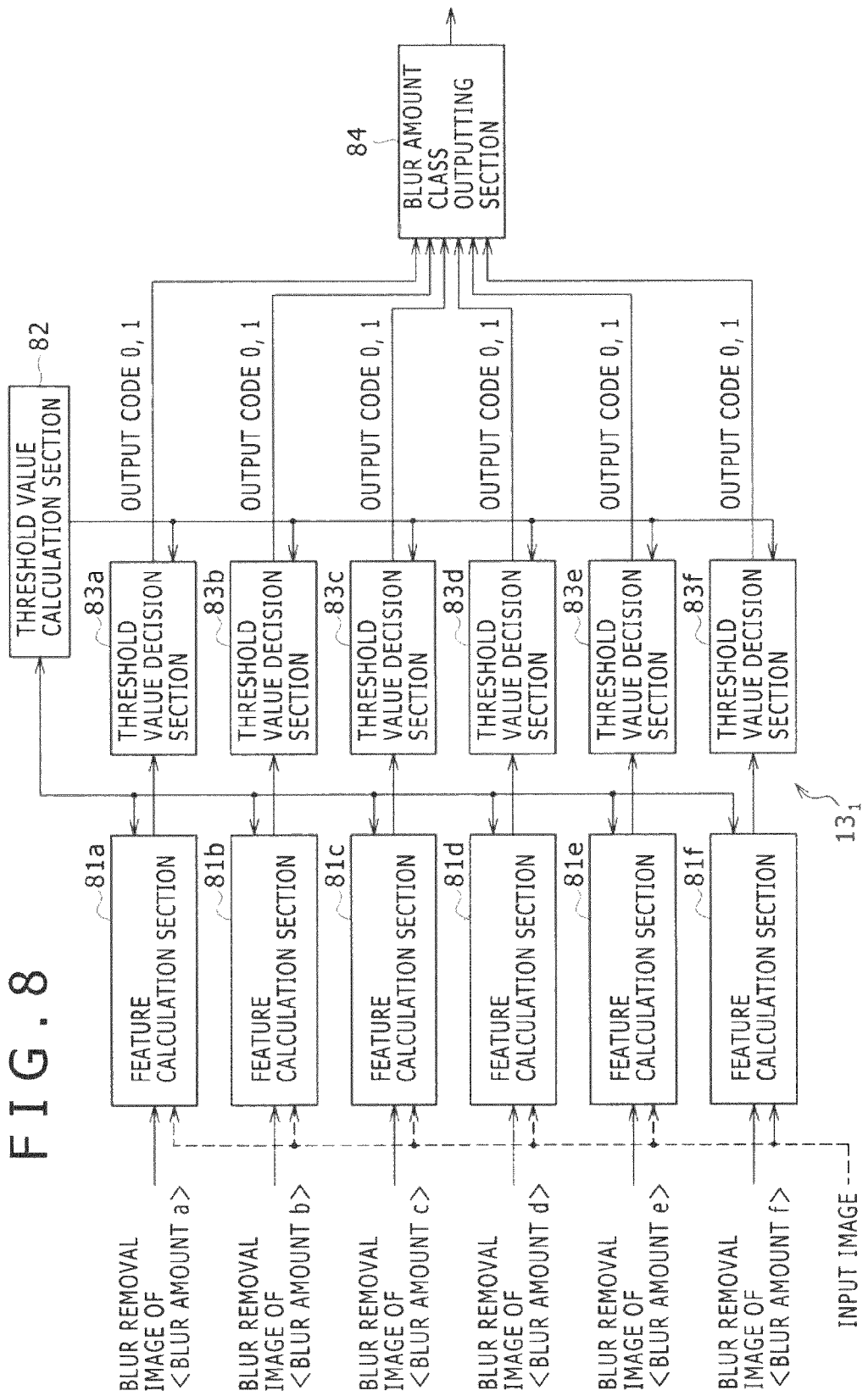
FIG. 8 is a block diagram showing an example of a configuration of the first form of the blur amount class production section.

FIG. 8 shows an example of a configuration of the blur amount class production section 13, particularly the blur amount class production section $13_1$, which produces a blur amount class code by carrying out the first decision method or the second decision method.

Referring to FIG. 8, the blur amount class production section $13_1$ includes feature calculation sections 81a to 81f, a threshold value calculation section 82, threshold value decision sections 83a to 83f, and a blur amount class outputting section 84.

A blur removal image which is a result of the blur removing process carried out by the blur removing processing section 11a is supplied to the feature calculation section 81a. Such a blur removal image is hereinafter referred to suitably as blur removal image of the blur amount a. To the feature calculation section 81b, a blur removal image which is a result of the blur removal process carried out by the blur removing processing section 11b is supplied. Such a blur removal image is hereinafter referred to suitably as blur removal image of the blur amount b. Also to the feature calculation sections 81c to 81f, blur removal images which are results of the blur removal process carried out by the blur removing processing sections 11c to 11f are supplied, respectively. Such blur removal images are hereinafter referred to suitably as blur removal images of the blur amounts c to f, respectively.

The feature calculation section 81a sets such a circular region as seen in FIG. 4 with respect to a pixel of interest and decides whether or not each of those pixels of the blur removal image of the blur amount a included in the set region satisfies the expression (11). Then, the feature calculation section 81a counts the number of those pixels which satisfy the expression (11) and supplies a result of the counting as a feature of the pixel of interest to the threshold value decision section 83a. Also the feature calculation sections 81b to 81f carry out a similar process for the blur removal images of the blur removing processing section 11b to 11f, respectively.

Where the first counting method is adopted by the feature calculation sections 81a to 81f, the threshold value calculation section 82 supplies 255 as threshold of the expression (11) to the feature calculation sections 81a to 81f, but where the second counting method is adopted, the threshold value calculation section 82 supplies a value set in advance as threshold to the feature calculation sections 81a to 81f.

Further, where the second decision method is adopted by the threshold value decision sections 83a to 83f, the threshold value calculation section 82 acquires the counting results of the feature calculation sections 81a to 81f and supplies an intermediate value between a maximum value and a minimum value from among the counting results to the threshold value decision sections 83a to 83f.

The threshold value decision section 83a converts the counting result from the feature calculation section 81a into a code or output code of "0" or "1" based on the first or second decision method and outputs the output code. In particular, where the first decision method is adopted, the threshold value decision section 83a determines a code depending upon whether or not the counting result supplied thereto from the feature calculation section 81a is "0," but where the second decision method is adopted, the threshold value decision section 83a decides a code of "0" or "1" depending upon whether or not the counting result supplied thereto from the feature calculation section 81a is higher than the intermediate value between the maximum value and the minimum value from among the counting results supplied thereto from the threshold value calculation section 82. This similarly applies also to the threshold value decision sections 83b to 83f.

The blur amount class outputting section 84 connects the output codes of "0" or "1" supplied thereto from the threshold value decision sections 83a to 83f in a predetermined order and outputs the connection of the output codes as a blur amount class code of 6 bits.

Figure 9:
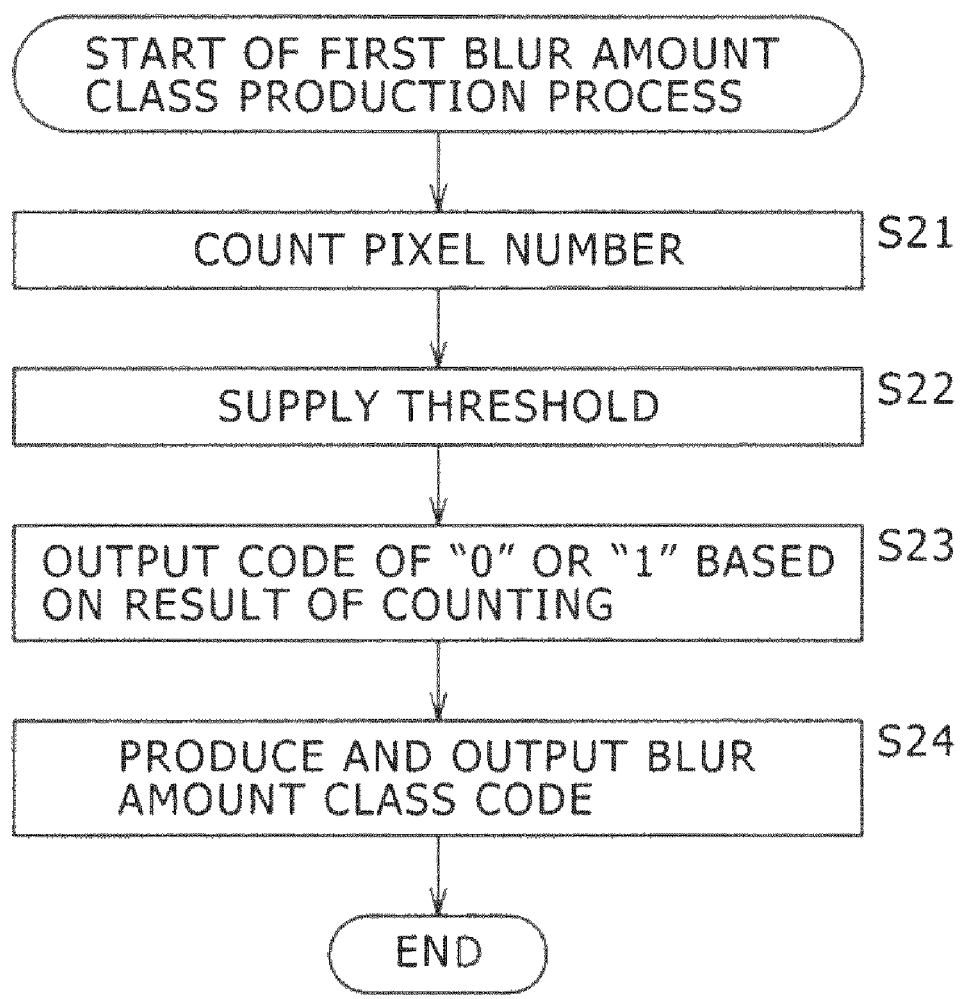
FIG. 9 is a flow chart illustrating a first blur amount class production process.

FIG. 9 illustrates a blur amount class production process, that is, a first blur amount class production process, by the blur amount class production section $13_1$.

Referring to FIG. 9, in the first blur amount class production process illustrated, the feature calculation section 81a sets, first at step S21, such a circular region as shown in FIG. 4 with respect to a pixel of interest and counts the number of pixels which satisfy the expression (11). A result of the counting is supplied as a feature of the pixel of interest to the threshold value decision section 83a. Also the feature calculation sections 81b to 81f count the number of pixels which satisfy the expression (11) and supply a result of the counting to the threshold value decision sections 83b to 83f, respectively.

At step S22, the threshold value calculation section 82 supplies threshold of the expression (11) to the threshold value decision sections 83a to 83f. Where the second decision method is adopted by the threshold value decision sections 83a to 83f, the threshold value calculation section 82 acquires the counting results of the feature calculation sections 81a to 81f, calculates an intermediate value between a maximum value and a minimum value from among the counting results, and supplies the calculated intermediate value to the threshold value decision sections 83a to 83f.

At step S23, the threshold value decision section 83a outputs a code of "0" or "1" based on the counting result from the feature calculation section 81a. Also the threshold value decision sections 83b to 83f similarly output a code of "0" or "1" based on the counting results from the feature calculation sections 81b to 81f, respectively.

At step S24, the blur amount class outputting section 84 produces and outputs a blur amount class code. In particular, the blur amount class outputting section 84 connects the codes of "0" or "1" outputted from the threshold value decision sections 83a to 83f to each other in a predetermined order and outputs the connected codes as a blur amount class code of 6 bits, thereby ending the processing.

Now, a second form of the blur amount class production section 13 is described.

The blur amount class production section 13 according to the second form produces a blur amount class code based on statistical data. The blur amount class production section 13 mentioned is hereinafter referred to as blur amount class production section $13_2$.

Figure 10:
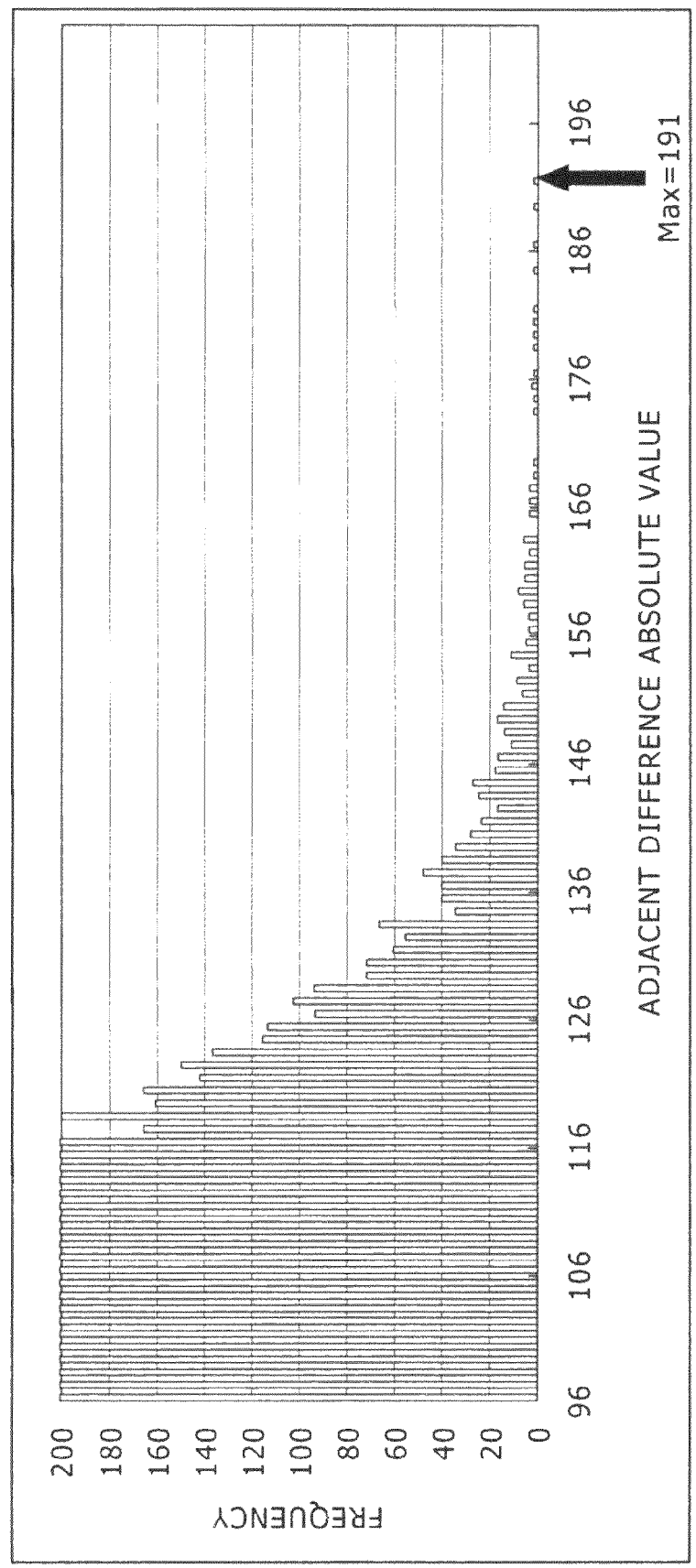
FIG. 10 is a diagram illustrating operation of a second form of the blur amount class production section.

For example, where an adjacent difference absolute value between pixel values, particularly with regard to adjacent pixels in the x direction, $|X(x, y)-X(x+1, y)|$, is determined as a feature and (pixel values of pixels of) a large number of images are used to produce a frequency distribution of the feature, such a result as illustrated in FIG. 10 is obtained. From FIG. 10, it can be recognized that the upper limit value to the adjacent difference absolute value as a feature, that is, the property value of the feature, is 191, and with regard to all of the many images, the adjacent difference absolute is likely to become less than 191.

Figure 11:
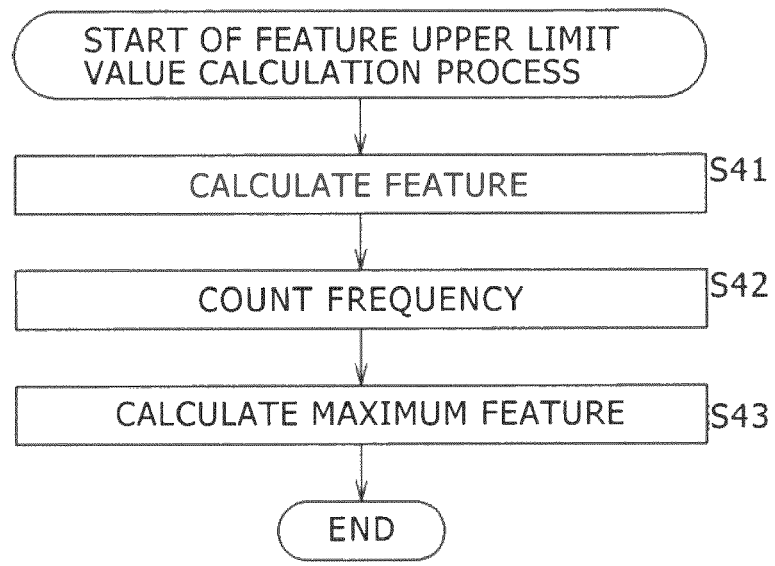
FIGS. 11 and 12 are flow charts illustrating operation of the second form of the blur amount class production section.

The frequency distribution illustrated in FIG. 10 and the upper limit value to the feature are determined by a feature upper limit value calculation process illustrated in FIG. 11.

Referring to FIG. 11, first at step S41, an adjacent difference absolute value as a feature is calculated with regard to pixels of a large number of images. At step S42, the frequency is counted for each feature. Then at step S43, a maximum feature whose frequency is not equal to zero is calculated and determined as an upper limit value to the feature.

Although it is found that, according to data collected by the process described above, an adjacent difference absolute value of an image is estimated to be lower than a predetermined value, also in a case wherein data are calculated not in a unit of an image but in a unit of a predetermined region, it is considered that the upper limit value to the feature differs depending upon whether the region is a flat place where the pixel value is substantially uniform, whether the region is a steep edge place, whether the region is a place which has complicated details or the like (which is associated with an upper limit value to the feature).

Figure 12:
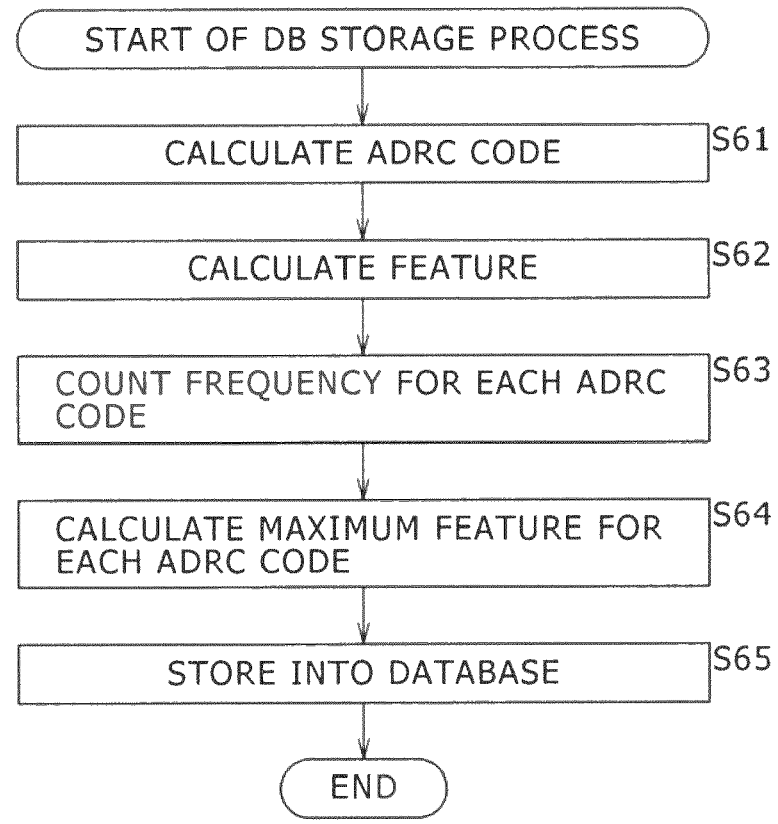

Therefore, by a DB (database) storage process of FIG. 12, a 1-bit ADRC (Adaptive Dynamic Range Coding) process is carried out for a predetermined region, for example, for a region of 3×3 pixels, centered at a pixel of interest with regard to an image same as that from which the frequency distribution of FIG. 10 is determined. Then, an upper limit to the adjacent difference absolute value is determined for each of ADRC codes obtained by the 1-bit ADRC process.

In the DB storage process, the pixels of all images used for production of a database are set as a pixel of interest first, and then processes at steps S61 and S62 are executed. At step S61, the blur amount class production section $13_2$ carries out 1-bit ADRC for a predetermined region, that is, a pixel of interest peripheral region, centered at the pixel of interest to calculate an ADRC code. At step S62, the blur amount class production section $13_2$ calculates a feature of the pixel of interest peripheral region. Here, the feature is the adjacent difference absolute value.

Then at step S63, the blur amount class production section $13_2$ counts the frequency of each of the features generated for each ADRC code. Then at step S64, the blur amount class production section $13_2$ calculates a maximum feature whose frequency is not zero for each ADRC code.

At step S65, the blur amount class production section $13_2$ stores the maximum value of the feature of each ADRC code determined at step S64 as an upper limit to the feature into the database.

Figure 13:
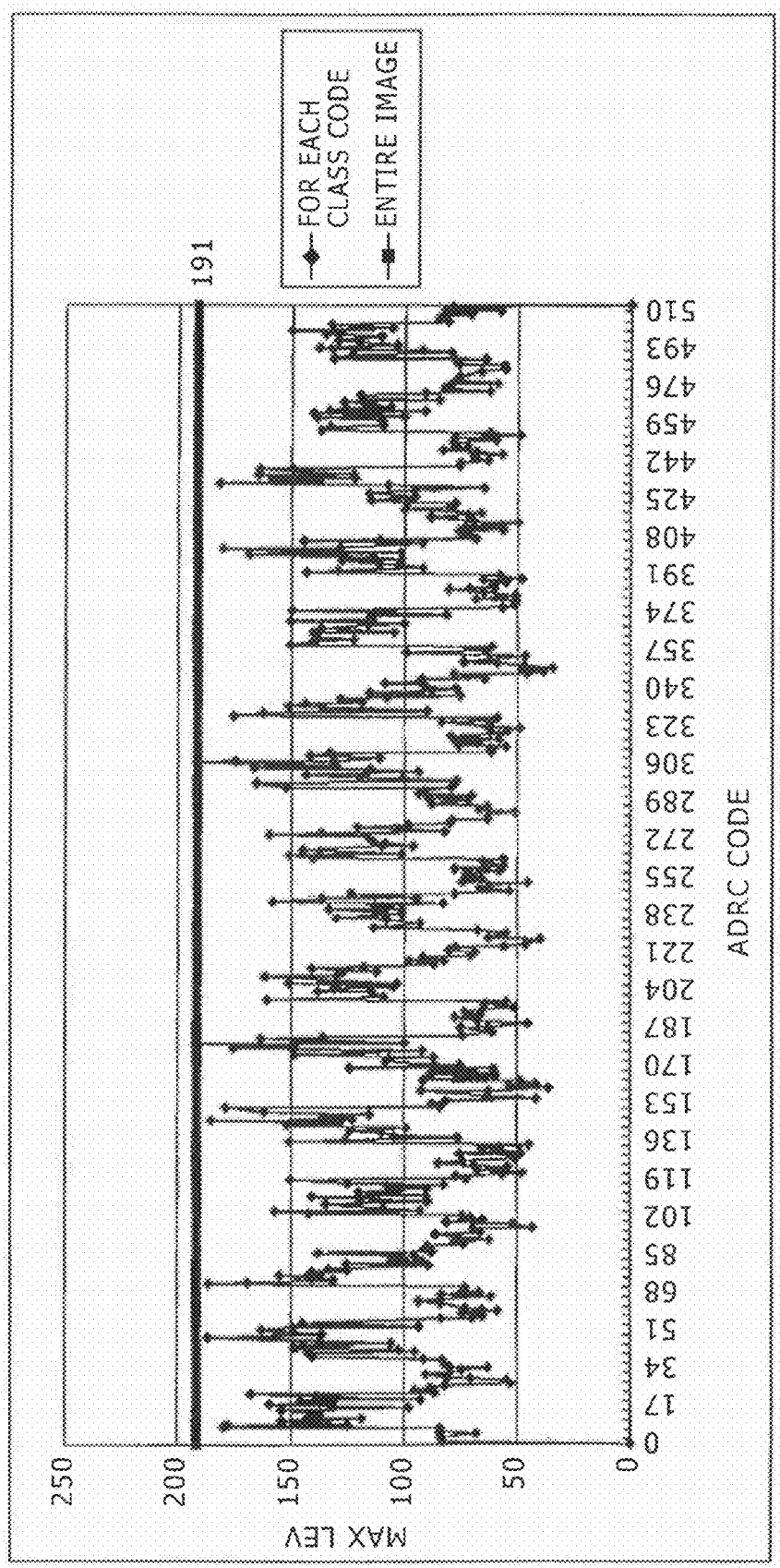
FIG. 13 is a diagram illustrating operation of the second form of the blur amount class production section.

A result of the DB storage process of FIG. 12 is illustrated in FIG. 13.

According to the result of FIG. 13, while the upper limit to the adjacent difference absolute value of the entire image is 191, it can be recognized that the upper limit to the feature is much different among the ADRC codes.

In the blur amount class production process by the blur amount class production section $13_2$, that is, in the second blur amount class production process, a blur amount class code is produced utilizing the upper limit value to the features of the ADRC codes.

Figure 14:
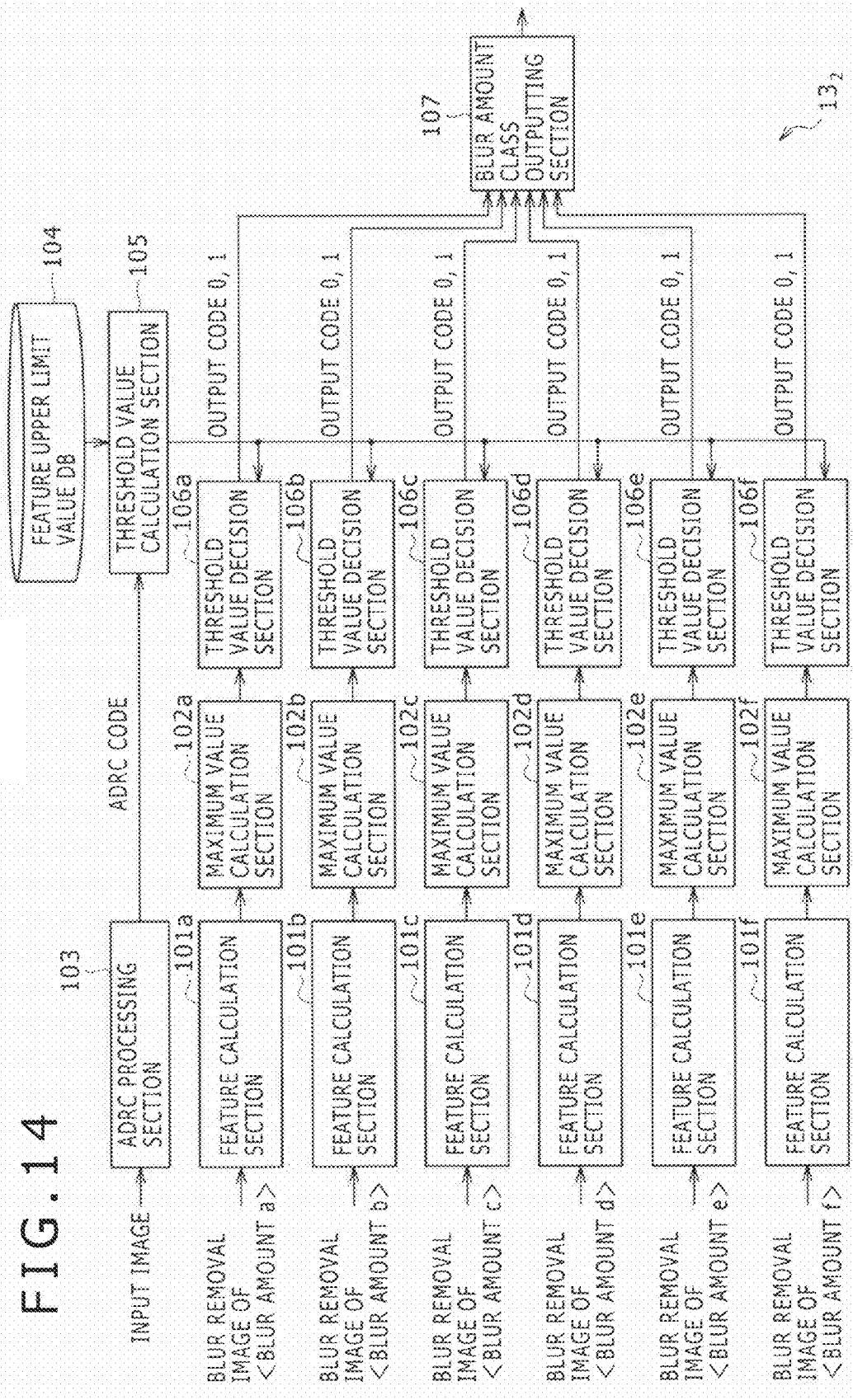
FIG. 14 is a block diagram showing an example of a configuration of the second form of the blur amount class production section.

FIG. 14 shows an example of a configuration of the blur amount class production section 13 according to the second form, that is, the blur amount class production section $13_2$.

Referring to FIG. 14, the blur amount class production section $13_2$ includes feature calculation sections 101a to 101f, maximum value calculation sections 102a to 102f, an ADRC processing section 103, a feature upper limit value database (DB) 104, a threshold value calculation section 105, threshold value decision sections 106a to 106f, and a blur amount class outputting section 107.

A blur removal image of the blur amount a is supplied to the feature calculation section 101a. A blur removal image of the blur amount b is supplied to the feature calculation section 101b. Blur removal images of the blur amounts c to f are supplied similarly to the feature calculation sections 101c to 101f, respectively.

The feature calculation section 101a sets such a circular region as described hereinabove with reference to FIG. 4 to pixels of the blur removal image of the blur amount a corresponding to a pixel of interest, calculates a feature, that is, an adjacent difference absolute value, for each of the pixels in the region and supplies the calculated features to the maximum value calculation section 102a. Also the feature calculation sections 101b to 101f carry out a similar process to the blur removable images of the blur removing processing section 11b to 11f, respectively.

The maximum value calculation section 102a calculates a maximum value of the features and supplies the maximum value to the threshold value decision section 106a. In particular, the maximum value calculation section 102a supplies a maximum one of the features of the pixels in the predetermined region centered at the pixel of interest calculated by the feature calculation section 101a to the threshold value decision section 106a. Also the maximum value calculation sections 102b to 102f carry out a similar process for the features supplied thereto from the feature calculation sections 101b to 101f similarly, respectively.

The ADRC processing section 103 carries out a 1-bit ADRC process for a region of 3×3 pixels centered at a pixel of the input image corresponding to the pixel of interest and supplies an ACRC code obtained by the 1-bit ADRC process to the threshold value calculation section 105.

According to the 1-bit ADRC process, the pixel values of the pixels in the 3×3 region centered at the pixel of the input image corresponding to the pixel of interest are divided by an average value of the maximum value MAX and the minimum value MIN (fractions are discarded) to convert the pixel values of the pixels into 1-bit values, that is, into binary values. Then, a bit train wherein the 1-bit pixel values in the 3×3 region are arranged in a predetermined order is determined as an ADRC code. It is to be noted that, for the classification technique into classes, an ADRC of more than 2 bits may be used or some other classification technique may be used.

In the feature upper limit value DB 104, an upper limit value to the features for each ADRC code obtained by the DB storage process described hereinabove with reference to FIG. 12 is stored. The threshold value calculation section 105 acquires an upper limit value to features corresponding to an ADRC code from the ADRC processing section 103 from the feature upper limit value database 104 and supplies the acquired upper limit as a threshold value to the threshold value decision sections 106a to 106f.

The threshold value decision section 106a compares the maximum value of the features supplied from the maximum value calculation section 102a with the threshold value supplied from the threshold value calculation section 105. Then, the threshold value decision section 106a outputs a code of "1" where the maximum value of the feature is higher than the threshold value, but outputs another code of "0" where the maximum value of the feature is lower than the threshold value.

Also the threshold value decision sections 106b to 106f decide whether or not the maximum values of the features supplied from the maximum value calculation sections 102b to 102f are higher than the threshold value and output the code of "1" or "0."

The blur amount class outputting section 107 connects the codes of "0" or "1," that is, the output codes, supplied from the threshold value decision sections 106a to 106f in a predetermined order similarly to the blur amount class outputting section 84 of the first form and outputs the connected codes as a blur amount class code of 6 bits.

Figure 15:
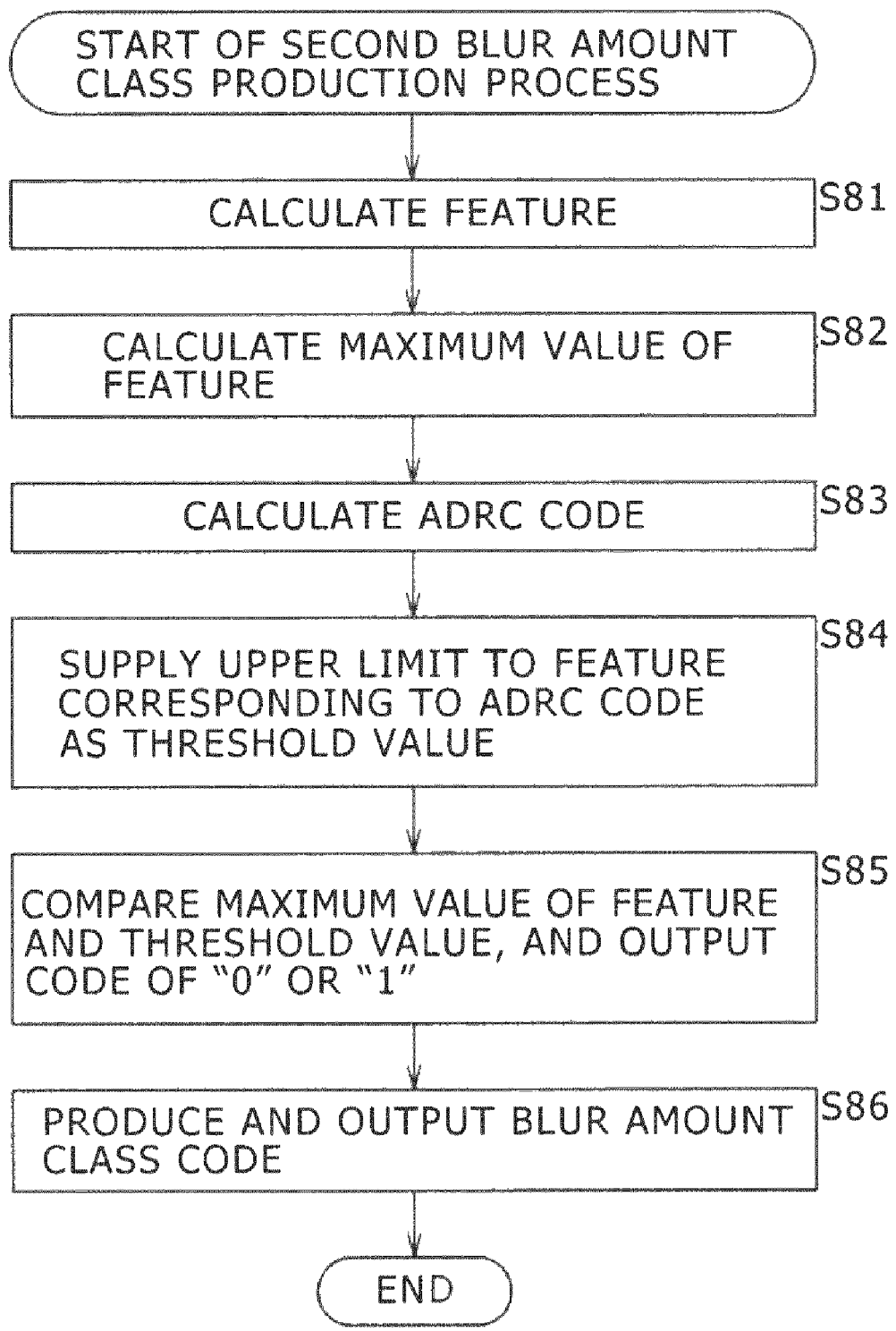
FIG. 15 is a flow chart illustrating a second blur amount class production process.

FIG. 15 illustrates the blur amount class production process, that is, the second blur amount class production process, by the blur amount class production section $13_2$.

Referring to FIG. 15, in the second blur amount class production process illustrated, first at step S81, the feature calculation section 101a sets such a circular region as described hereinabove with reference to FIG. 4 for pixels of a blur removal image of the blur amount a corresponding to a pixel of interest and calculates a feature, that is, an adjacent difference absolute value, for each pixel in the region. Also the feature calculation sections 101b to 101f carry out a similar process for blur removal images of the blur removing processing section 11b to 11f, respectively.

At step S82, the maximum value calculation section 102a calculates a maximum value of the features and supplies the maximum value to the threshold value decision section 106a. Also the maximum value calculation sections 102b to 102f calculate the maximum value of the features supplied from the feature calculation sections 101b to 101f, respectively.

At step S83, the ADRC processing section 103 carries out a 1-bit ADRC process for a region of 3×3 pixels around a pixel of the input image corresponding to the pixel of interest and supplies an ADRC code obtained by the 1-bit ADRC process to the threshold value calculation section 105.

At step S84, the threshold value calculation section 105 acquires an upper limit value to the feature corresponding to the ADRC code from the ADRC processing section 103 from the feature upper limit value DB 104 and supplies the acquired upper limit value as a threshold value to the threshold value decision sections 106a to 106f.

The processes at steps S81 and S82 or at steps S83 and 84 may be carried out simultaneously or in parallel.

At step S85, the threshold value decision section 106a compares the maximum value of the feature and the threshold value with each other. Then, if the maximum value of the feature is higher than the threshold value, then the threshold value decision section 106a outputs a code of "1," but if the maximum value of the feature is lower than the threshold value, then the threshold value decision section 106a outputs another code of "0" to the blur amount class outputting section 107.

At step S86, the blur amount class outputting section 107 connects the codes of "0" or "1" supplied from the threshold value decision sections 106a to 106f in a predetermined order and outputs a result of the connection as a blur amount class code of 6 bits, thereby ending the processing.

As described above, in the second blur amount class production process, an ADRC code of pixels of an input image corresponding to a pixel of interest is determined, and an upper limit value to the feature, that is, an adjacent difference absolute value, within a predetermined region centered at a pixel of a blur removal image corresponding to the pixel of interest is calculated. Then, a code of "0" or "1" is determined depending upon whether or not the calculated upper limit value to the feature is higher than the upper limit to the adjacent difference absolute value of the ADRC code (as seen in the database in FIG. 13) same as the determined ADRC code. Then, the codes of "0" or "1" are connected into and outputted as a blur amount class code of 6 bits.

A blur removal image for which the blur removal process is executed with a blur parameter which is not appropriate suffers from a failure such as ringing. Thus, if such a failure occurs, then although an upper limit to a physical amount statistically calculated from general image data is frequently exceeded, then it is considered that the second blur amount class production process is a process which utilizes the phenomenon just described. Further, according to the second blur amount class production process, by using different threshold values in response to a different image characteristic such as a 1-bit ADRC, the accuracy with which the phenomenon described above is grasped can be raised.

It is to be noted that, while the second form described above adopts an adjacent difference absolute value as a feature, it is otherwise possible to adopt not a single feature but a plurality of features.

Figure 16:
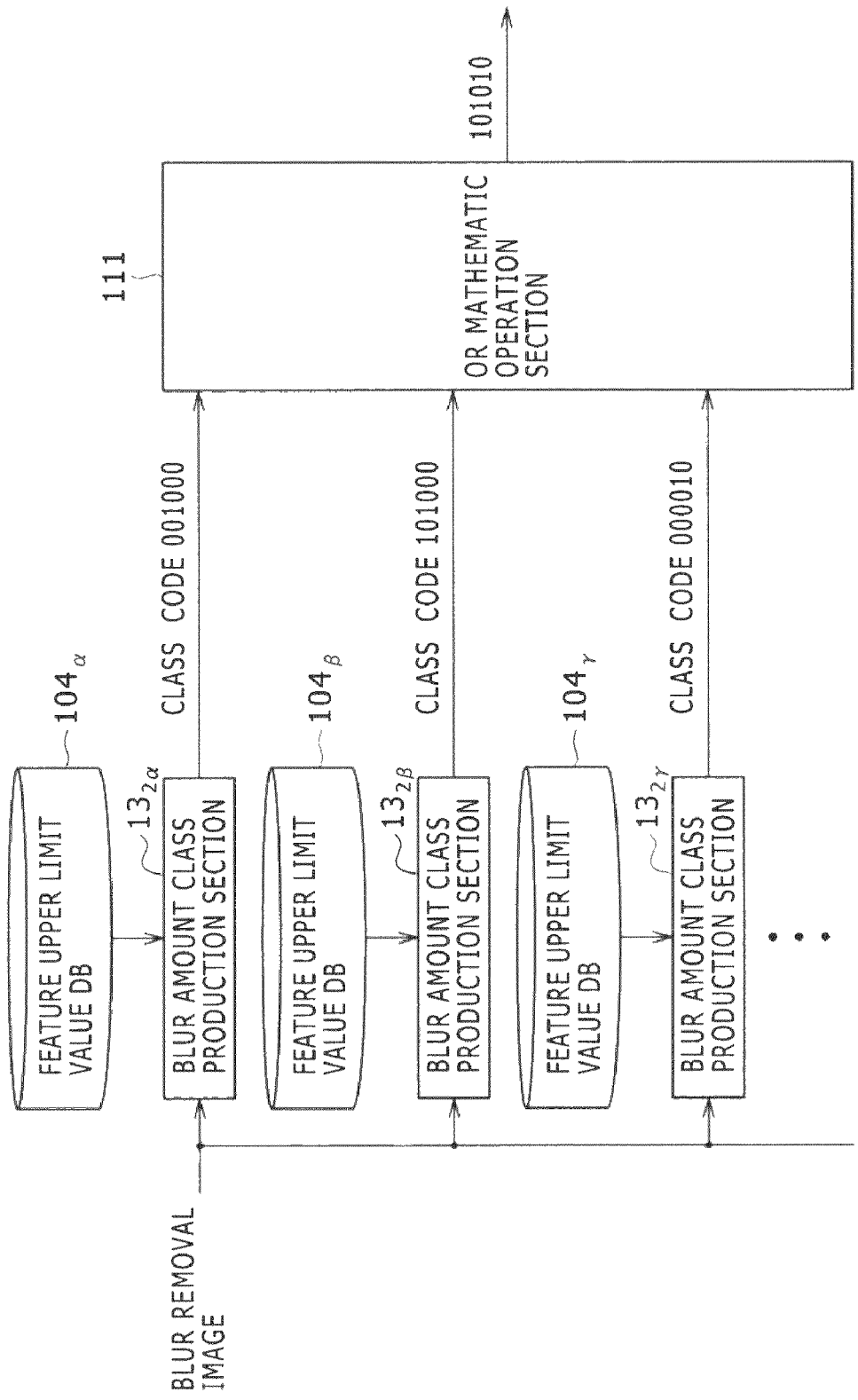
FIG. 16 is a block diagram showing another example of a configuration of the second form of the blur amount class production section.

FIG. 16 illustrates an example of a configuration which outputs a blur amount class code with a plurality of features.

Referring to FIG. 16, blur amount class production sections $13_{2\alpha}$, $13_{2\beta}$ and $13_{2\gamma}$ have a configuration similar to that described hereinabove with reference to FIG. 14. However, in order to facilitate understandings of a difference among the blur amount class production sections $13_{2\alpha}$, $13_{2\beta}$ and $13_{2\gamma}$ and the blur amount class production section $13_2$ of FIG. 14, the feature upper limit value DB 104 for the feature shown in FIG. 14 is shown separately as feature upper limit value DB $104_\alpha$, $104_\beta$ and $104_\gamma$.

In the feature upper limit value DB $104_\alpha$, an upper limit to the feature α for each ADRC code is stored. Further, in the feature upper limit value database $104_\beta$, an upper limit value to the feature β for each ADRC code is stored. In the feature upper limit value DB $104_\gamma$, an upper limit value to the feature γ for each ADRC code is stored.

The blur amount class production section $13_{2\alpha}$ outputs a blur amount class code regarding the feature α, and the blur amount class production section $13_{2\beta}$ outputs a blur amount class code regarding the feature β while the blur amount class production section $13_{2\gamma}$ outputs a blur amount class code regarding the feature γ.

An OR mathematic operation section 111 carries out an ORing process for each of figures of the blur amount class codes outputted from the blur amount class production sections $13_{2\alpha}$, $13_{2\beta}$ and $13_{2\gamma}$ and outputs a result of the ORing operation as a final blur amount class code.

For example, if the blur amount class production section $13_{2\alpha}$ outputs a blur amount class code of "001000" and the blur amount class production section $13_{2\beta}$ outputs another blur amount class code of "101000" while the blur amount class production section 132Y outputs a further blur amount class code of "000010" as seen in FIG. 16, then the final blur amount class code outputted from the OR mathematic operation section 111 is "101010."

The features which can be adopted as the features α, β and γ may be, for example, first derivative absolute values or second derivative absolute values in the horizontal or x direction, vertical or y direction, and oblique direction or the like.

The first derivative absolute values $P_1(x, y)$ in the horizontal, vertical, and oblique directions can be represented by the expressions (12), (13) and (14) given below and the second derivative absolute values $P_2(x, y)$ in the horizontal, vertical, and oblique directions can be represented by the expressions (15), (16), and (17) given below, respectively.

$$P_1(x,y)=|X(x,y)-X(x+1,y)| \tag{12}$$

$$P_1(x,y)=|X(x,y)-X(x,y+1)| \tag{13}$$

$$P_1(x,y)=|X(x,y)-X(x+1,y+1)| \tag{14}$$

$$P_2(x,y)=|1\times X(x,y)-X(x+1,y)-X(x-1,y)| \tag{15}$$

$$P_2(x,y)=|2\times X(x,y)-X(x,y+1)-X(x,y-1)| \tag{16}$$

$$P_2(x,y)=|2\times X(x,y)-X(x+1,y+1)-X(x-1,y-1)| \tag{17}$$

Now, a third form of the blur amount class production section 13 is described.

Also the blur amount class production section 13 of the third form (hereinafter referred to as blur amount class production section $13_3$) stores a database in advance and produces a blur amount class code based on the database similarly as in the second form described above.

Figure 17:
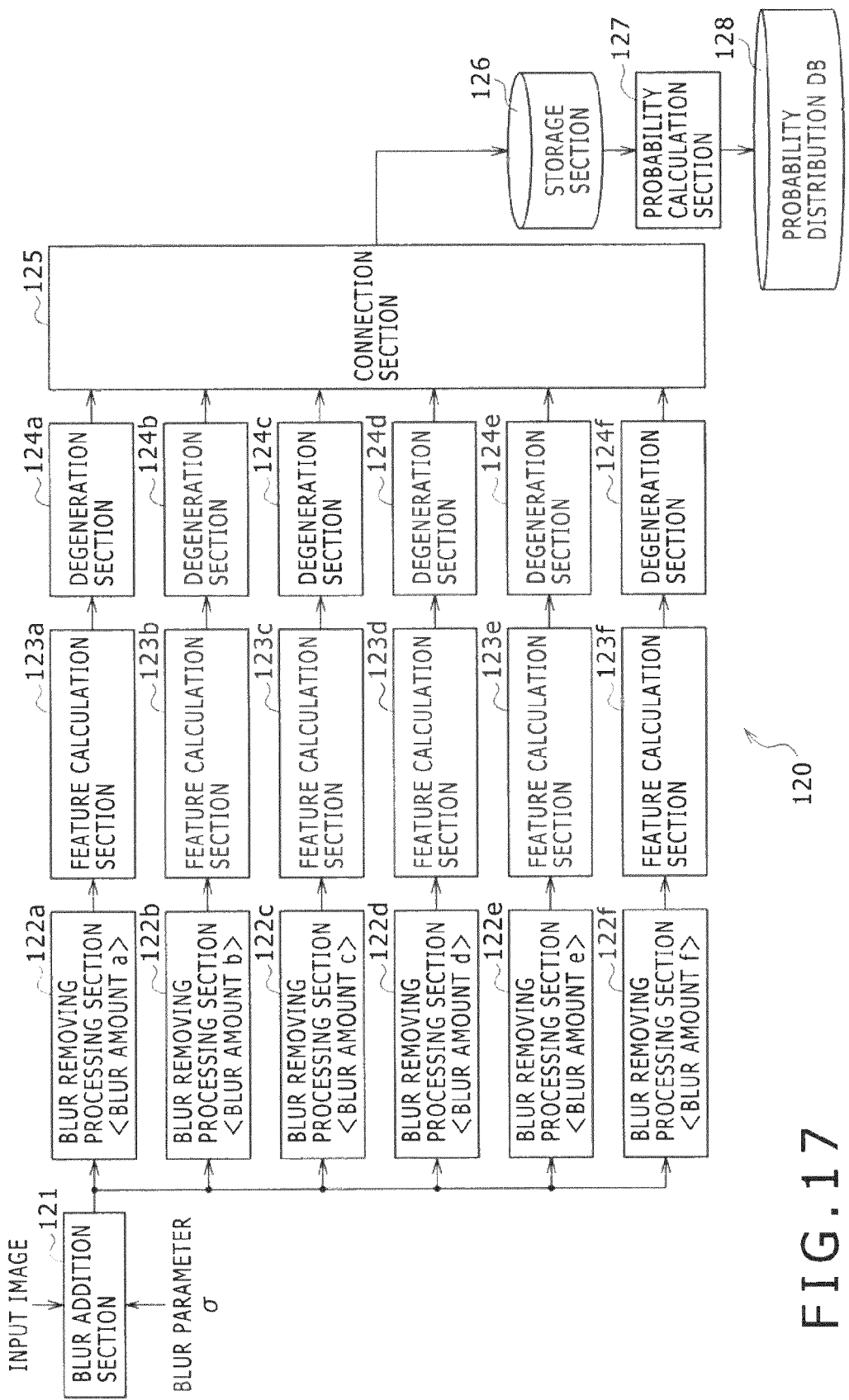
FIG. 17 is a block diagram showing a third form of the blur amount class production section.

FIG. 17 shows an example of a configuration of a database (DB) production section 120 which produces a database which is utilized in the blur amount class production section $13_3$ of the third form.

Referring to FIG. 17, the database production apparatus 120 includes a blur addition section 121, blur removing processing sections 122a to 122f, feature calculation sections 123a to 123f, degeneration sections 124a to 124f, a connection section 125, a storage section 126, a probability calculation section 127 and a probability distribution database 128.

The blur addition section 121 carries out convolution mathematic operation of the expression (2) wherein a blur parameter σ given thereto from the outside for the input signal to produce a blur image similarly to the blur addition section 42 described hereinabove with reference to FIG. 3.

The blur removing processing sections 122a to 122f carry out a blur removing process for a blur image from the blur addition section 121 similarly to the blur removing processing sections 11a to 11f described hereinabove with reference to FIG. 1, respectively. The blur amount of the image to be removed by the blur removing processing sections 122a to 122f is the blur amounts a to f, respectively. It is to be noted that it is assumed that, in the database production apparatus 120, blur removal coefficients utilized for the product sum mathematic operation are stored in the blur removing processing sections 122a to 122f, respectively.

Each of the feature calculation sections 123a to 123f calculates a feature for each of pixels in a predetermined region such as, for example, such a circular region as described hereinabove with reference to FIG. 4 which is set with respect to the pixel of interest. The calculated features are supplied to the degeneration sections 124a to 124f. In the present form, the feature calculation sections 123a to 123f calculate one of the features or derivative type features represented by the expressions (12) to (17) given hereinabove.

The degeneration sections 124a to 124f carry out a bit degeneration process for the features supplied from the feature calculation sections 123a to 123f, respectively. For example, where the features supplied from the feature calculation sections 123a to 123f are 8-bit data, the degeneration sections 124a to 124f degenerate the features into 5-bit data by deleting 3 bits on the LSB (Least Signification Bit) side and outputs the degenerated features.

The connection section 125 connects the degenerated features supplied from the degeneration sections 124a to 124f in a predetermined order to produce a feature code and supplies the feature code to the storage section 126. For example, if it is assumed that, in the example described above, 5-bit features are supplied from the degeneration sections 124a to 124f, then the feature code supplied to the storage section 126 is formed from 30 bits. In this instance, $2^{30}$ different feature codes can be supplied to the storage section 126 at the succeeding stage. However, where the number of classes of the feature code is great, the degeneration amount of the degeneration sections 124a to 124f is increased. Conversely speaking, the degeneration amount in each of the degeneration sections 124a to 124f is set by an experiment or the like so that the class number of the feature code of the storage section 126 may become an appropriate number.

The storage section 126 increments, every time a feature code is supplied thereto from the connection section 125, the supplied frequency of the feature code by one to store a frequency distribution of the feature codes. Further, to the storage section 126, the blur parameter σ same as that provided to the blur addition section 121 is supplied, and the storage section 126 stores also the parameter σ used for determination of the supplied feature codes.

The database production apparatus 120 sets the blur parameter σ to various values with regard to the input image supplied thereto from the blur addition section 121 thereby to determine feature codes for blur images of various blur amounts produced thereby. Then, the thus determined features are stored together with the information of the blur parameter σ into the storage section 126. Also with regard to the input image, information of the feature code and the blur parameter σ obtained by allocating the blur parameter σ not only to one image but also to a large number of images is stored into the storage section 126.

As a result, if the data stored in the storage section 126 are referred to, then the frequency, that is, the number of times of appearance, of each blur parameter with regard to each of the feature codes can be known together with the frequency of each feature code, that is, together with the total numbers of times of appearance of the feature codes.

The probability calculation section 127 calculates the probability of each blur parameter σ with regard to each feature code. The probability calculation section 127 carries out a process of determining σ value when the frequency of each blur parameter σ is divided by the frequency of the predetermined feature code, that is, the frequency of the blur parameter σ/frequency of the feature code for all feature codes.

The probability distribution database 128 stores the probability for each blur parameter σ regarding each feature code calculated by the probability calculation section 127.

Figure 18:
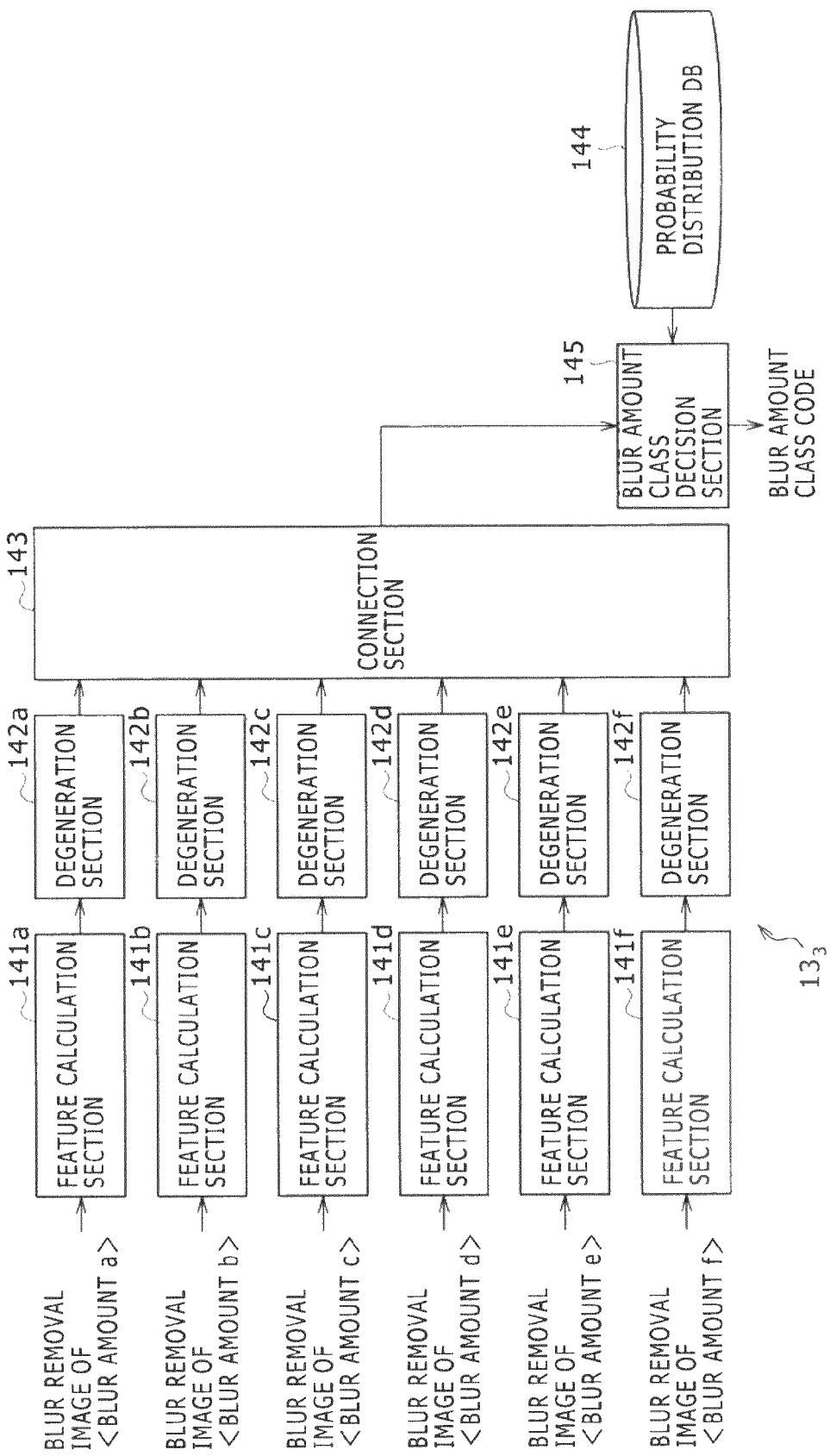
FIG. 18 is a block diagram showing an example of a configuration of the third form of the blur amount class production section.

FIG. 18 shows an example of a configuration of the blur amount class production section 13 of the third form, that is, the blur amount class production section $13_3$.

Referring to FIG. 18, the blur amount class production section $13_3$ includes feature calculation sections 141a to 141f, degeneration sections 142a to 142f, a connection section 143, a blur amount class decision section 145, and a probability distribution database 144.

The feature calculation sections 141a to 141f, degeneration sections 142a to 142f and connection section 143 carry out processes similar to those of the feature calculation sections 123a to 123f, degeneration sections 124a to 124f and connection section 125 of the database production apparatus 120 described hereinabove with reference to FIG. 17, respectively.

In particular, the feature calculation sections 141a to 141f calculate a feature regarding each of pixels in a predetermined region of a blur removal image set corresponding to a pixel of interest and outputs the features to the degeneration sections 124a to 124f, respectively. The degeneration sections 142a to 142f carry out a bit degeneration process for the features supplied thereto from the feature calculation sections 141a to 141f, respectively. The connection section 143 connects the degenerated features supplied thereto from the degeneration sections 124a to 124f in a predetermined order to produce a feature code.

The probability distribution database 144 stores data produced by the database production apparatus 120 described hereinabove with reference to FIG. 17. The probability distribution database 144 copies or moves and stores the probability for each blur parameter σ regarding each feature code stored in the probability distribution database 128 of the database production apparatus 120. It is to be noted that the probability calculation section 127 of the database production apparatus 120 may alternatively store the calculated probability for each blur parameter σ regarding each feature code directly into the probability distribution database 144.

The blur amount class decision section 145 refers to the probability distribution database 144 and outputs a blur amount class code corresponding to the feature code supplied from the connection section 143. In particular, the blur amount class decision section 145 specifies a feature code same as the feature code supplied from the connection section 143 based on the probability distribution database 144 and outputs the blur parameter σ having the highest probability among the probabilities for each blur parameter σ of the specified feature code as a blur amount class code.

Figure 19:
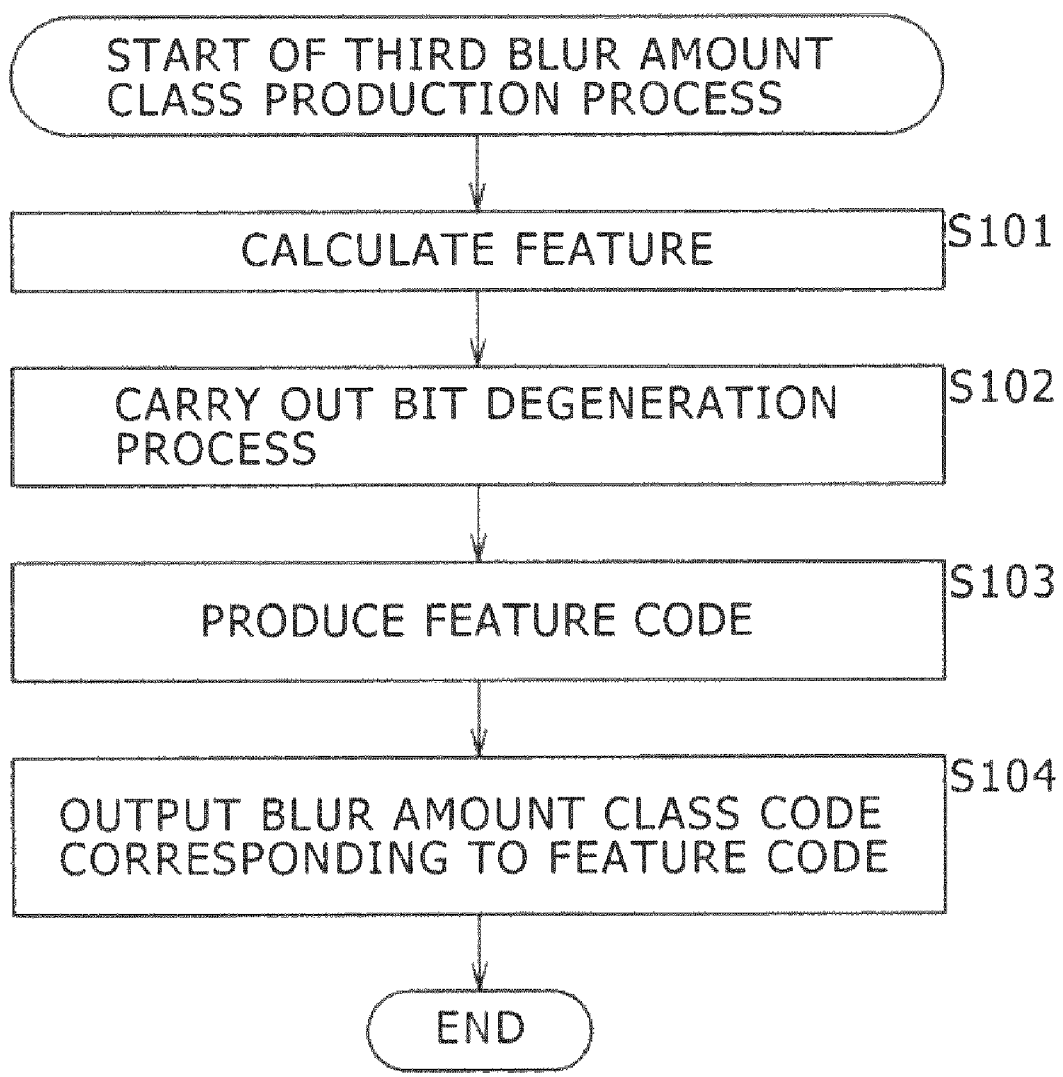
FIG. 19 is a flow chart illustrating a third blur amount class production process.

FIG. 19 illustrates a blur amount class production process by the blur amount class production section $13_3$, that is, a third blur amount class production process.

Referring to FIG. 19, first at step S101, the feature calculation sections 141a to 141f calculate the feature regarding each of the pixels in a predetermined region of a removal image set corresponding to the pixel of interest.

At step S102, the degeneration sections 142a to 142f carry out a bit degeneration process for the features supplied from the feature calculation sections 141a to 141f, respectively.

At step S103, the connection section 143 connects the degenerated features supplied from the degeneration sections 124a to 124f in a predetermined order to produce a feature code.

At step S104, the blur amount class decision section 145 refers to the probability distribution database 144 and outputs a blur amount class code corresponding to the feature code supplied form the connection section 143, thereby ending the processing.

Figure 20:
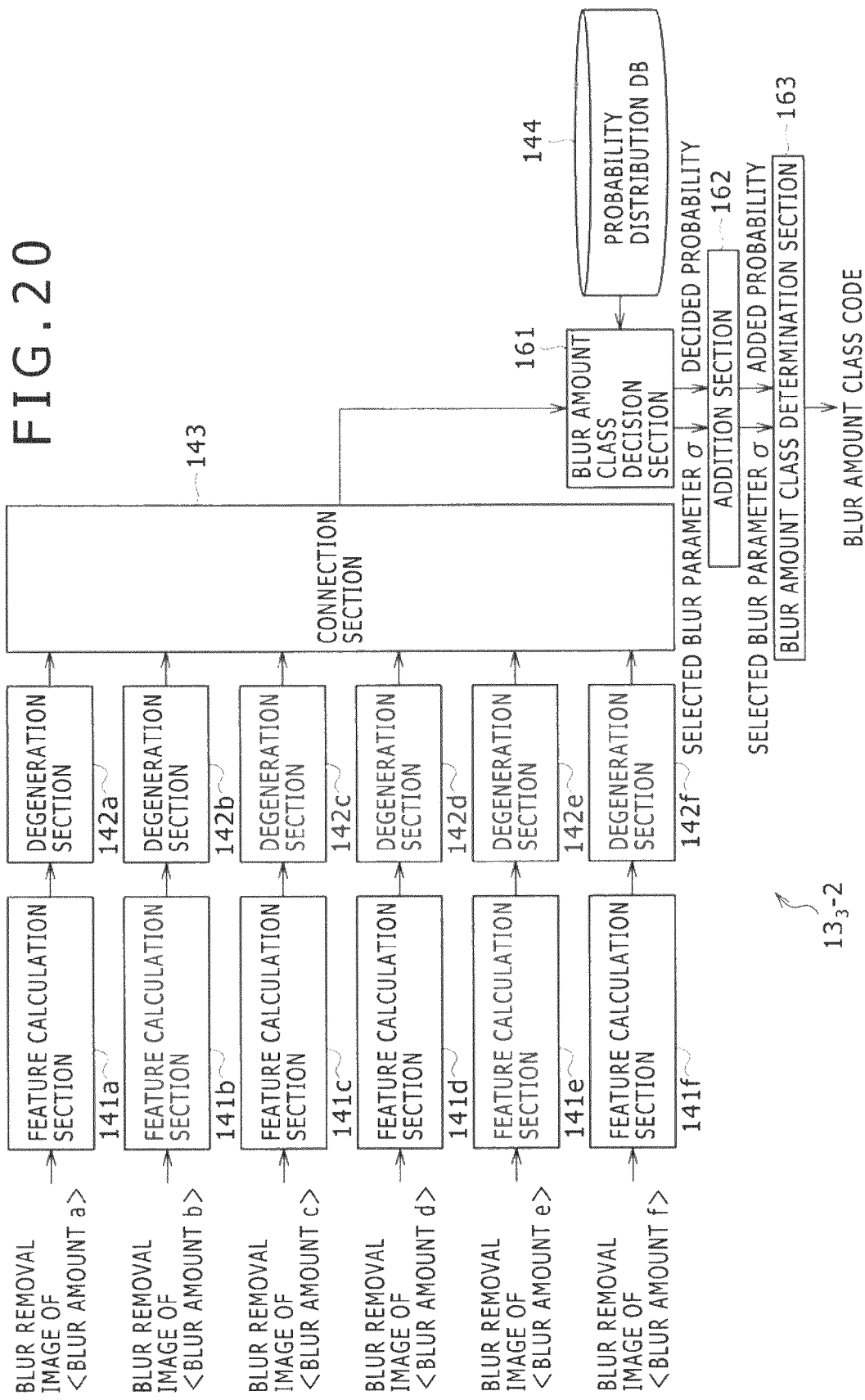
FIG. 20 is a block diagram showing another example of a configuration of the third form of the blur amount class production section.

FIG. 20 shows an example of a configuration of a blur amount class production section $13_3$-2 which is a modification to the blur amount class production section $13_3$ of the third form.

Referring to FIG. 20, the blur amount class production section $13_3$-2 includes feature calculation sections 141a to 141f, degeneration sections 142a to 142f, a connection section 143 and a probability distribution database 144 similar to those of the blur amount class production section $13_3$ described hereinabove with reference to FIG. 18.

Figure 21:
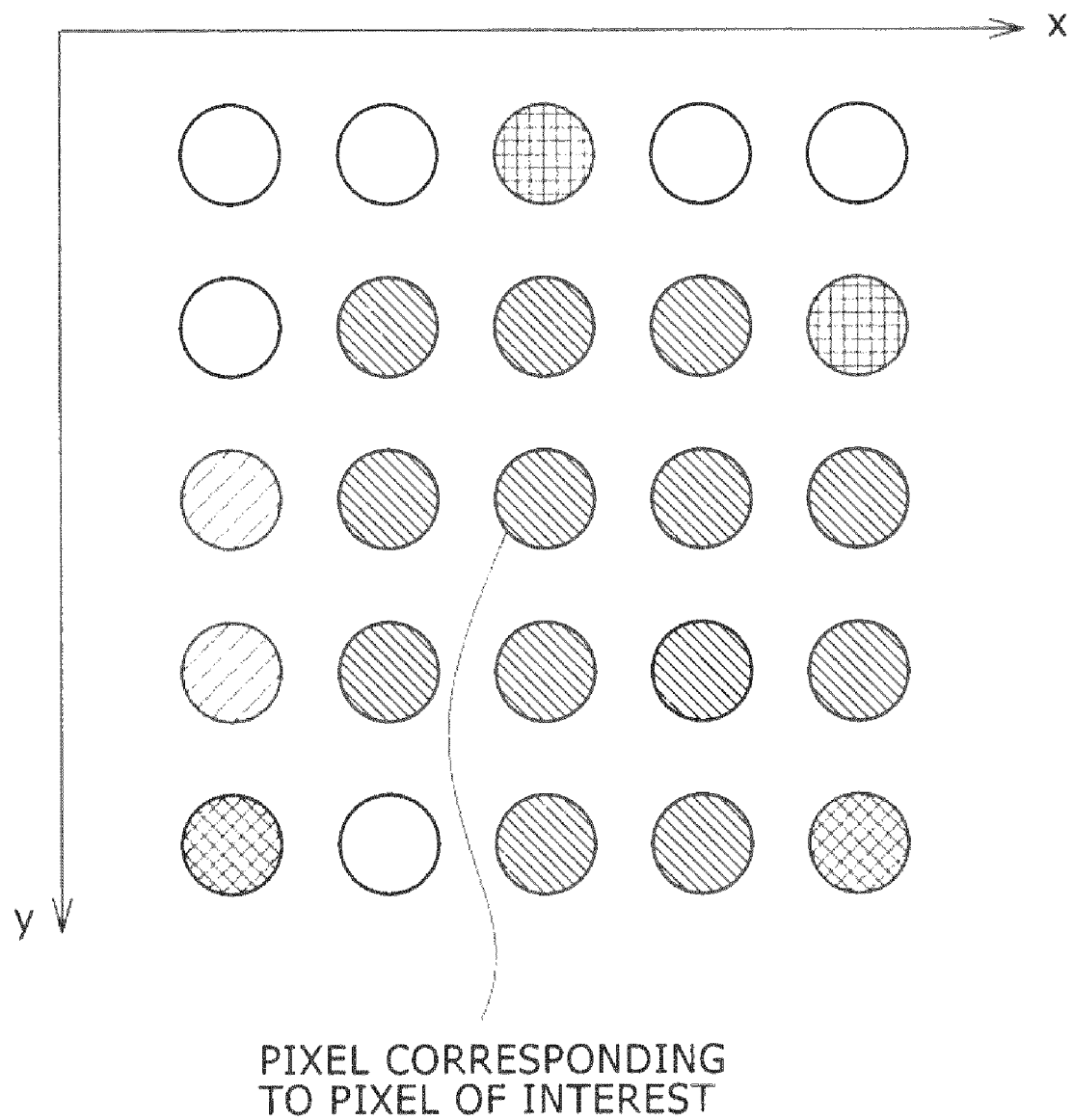
FIG. 21 is a diagrammatic view illustrating operation of the third form of the blur amount class production section.

Referring to FIG. 21, the blur amount class decision section 161 selects, with regard to a pixel of a blur removal image corresponding to a pixel of interest and pixels within a region determined in advance, that is, a peripheral region, around the pixel, a blur parameter σ which exhibits the highest probability corresponding to a feature code.

Accordingly, the feature calculation sections 141a to 141f, degeneration sections 142a to 142f and connection section 143 calculate feature codes corresponding to individual pixels in the surrounding region and supply the feature codes to the blur amount class decision section 161. Then, the blur amount class decision section 161 supplies, regarding the pixels in the peripheral region, the selected blur parameter σ having the highest probability and the probability, that is, the decision probability, to the addition section 162.

Those of the 25 pixels shown in FIG. 21 which have each same pattern applied thereto indicate that the same blur parameter σ is selected.

The addition section 162 adds the decision probability of the pixels in the peripheral region for each same selected blur parameter σ. Then, the addition section 162 supplies the selected blur parameters σ and added probabilities which are results of the addition of the selected blur parameters σ to the blur amount class determination section 163. The blur amount class determination section 163 outputs the selected blur parameter σ which exhibits the highest added probability as a blur amount class code.

The blur amount class production section $13_3$-2 of FIG. 20 utilizes the nature that, unless a pixel of an input image corresponding to a pixel of interest is on the boundary of the object or the like, also peripheral pixels around the pixel have a substantially same blur amount. Thus, the blur amount class production section $13_2$ uses the probability not only of the pixel of the input image corresponding to the pixel of interest but also of pixels in the peripheral region to carry out comprehensive decision thereby to raise the accuracy in blur amount classification.

Now, other modifications to the blur amount class production section $13_3$ of the third form are described.

In the blur amount class production section $13_3$-2 described hereinabove with reference to FIG. 20, the addition section 162 adds the probabilities of each same selected blur parameter σ and outputs the blur parameter σ which exhibits the addition probability after the addition as a blur amount class code. However, in the other modifications to the blur amount class production section $13_3$ described below, when the probabilities of the same selected blur parameter σ are added, the possibility of noise is decided, and where decision of noise is made with regard to a selected blur parameter σ, then the addition of the selected blur parameter σ is not carried out.

Where noise overlaps with a flat place in an image, an error frequently occurs with detection of a blur amount. This arises from the fact that it cannot be distinguished from a feature what blur size the flat place in the image has. At such a place as mentioned above, even if some blur amount is decided as a class, since it has a feature influenced by the noise included in the input image, the reliability of the decided blur amount is low.

Accordingly, if a blur amount calculated from an original feature of an image and a blur amount calculated from noise are distinguished from each other, then the detection accuracy of the blur amount calculated from the original feature of the image can be raised.

To this end, it is necessary to produce a database for decision of noise in advance. FIG. 22 shows an example of a configuration of a noise database (DB) production apparatus 180 for producing a noise frequency distribution database for use for decision of noise.

Referring to FIG. 22, the noise database production apparatus 180 includes a noise addition section 191, blur removing processing sections 192a to 192f, feature calculation sections 193a to 193f, degeneration sections 194a to 194f, a connection section 195, a frequency calculation section 196 and a noise frequency distribution database (DB) 197.

An image which is generally flat is supplied as an input image to the noise addition section 191. The noise addition section 191 adds random noise to the input image to produce a noise addition image and supplies the noise addition image to the blur removing processing sections 192a to 192f.

The blur removing processing sections 192a to 192f, feature calculation sections 193a to 193f, degeneration sections 194a to 194f and connection section 195 carry out processes similar to those carried out by the blur removing processing sections 122a to 122f, feature calculation sections 123a to 123f, degeneration sections 124a to 124f and connection section 125 of the database production apparatus 120 of FIG. 17, respectively.

In particular, the blur removing processing sections 192a to 192f carry out a blur removing process for the noise addition image from the noise addition section 191. The feature calculation sections 193a to 193f calculate a feature for each of pixels in a predetermined region set with regard to a pixel of interest and supply the calculated features to the degeneration sections 194a to 194f, respectively.

The degeneration sections 194a to 194f carry out a bit degeneration process for the features supplied from the feature calculation sections 193a to 193f, respectively. The connection section 195 connects the degenerated features supplied from the degeneration sections 194a to 194f in a predetermined order to produce a feature code.

The frequency calculation section 196 classifies the feature code supplied from the connection section 195 and stores the classified feature code for each feature code into the noise frequency distribution database 197. As a result, a frequency distribution of the feature codes by noise is stored.

Figure 23:
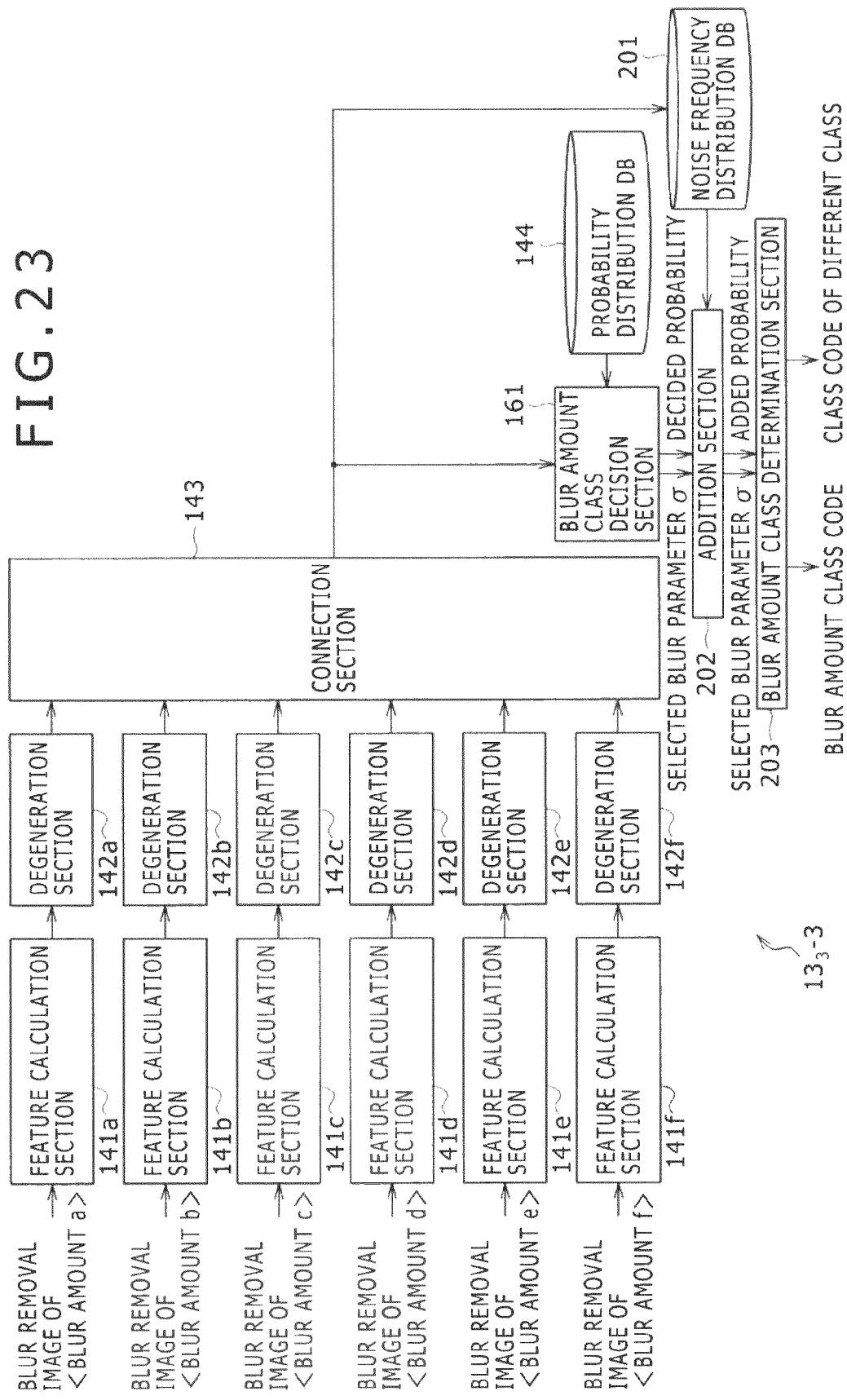
FIG. 23 is a block diagram showing a further example of a configuration of the third form of the blur amount class production section.

FIG. 23 shows a modification to the blur amount class production section $13_3$ of the third form and particularly shows an example of a configuration of the blur amount class production section $13_3$-3 which utilizes a frequency distribution of feature codes by noise stored in the noise frequency distribution database 197 shown FIG. 22.

Referring to FIG. 23, the blur amount class production section $13_3$-3 is a modification also to but is different from the blur amount class production section $13_3$-3 shown in FIG. 20 in that it additionally includes a noise frequency distribution database (DB) 201 and further includes an addition section 202 and a blur amount class determination section 203 in place of the addition section 162 and the blur amount class determination section 163, respectively.

The blur amount class decision section 161 supplies a selected blur parameter σ and a decision probability of the selected blur parameter σ regarding each of pixels in a peripheral region to the addition section 202. In the present modification, the blur amount class decision section 161 further supplies a feature code to the addition section 202.

A frequency distribution of feature codes by noise produced by the noise database production apparatus 180 shown in FIG. 22 and stored in the noise frequency distribution database 197 is stored in the noise frequency distribution database 201 by copy or by movement.

The addition section 202 adds the probability of pixels in the peripheral region for the same selected blur parameter σ. Thereupon, the addition section 202 refers to the frequency of the feature codes supplied from the blur amount class decision section 161 and, if the frequency of the feature codes is higher than a predetermined frequency, then the addition section 202 does not carry out the addition of the probability because it decides that the possibility of noise is high. The addition probability of the selected blur parameter σ with which addition of the probability is not carried out is set to zero. On the other hand, if the frequency of the feature codes supplied from the blur amount class decision section 161 in the noise frequency distribution database 201 is lower than the predetermined frequency, then the addition section 202 adds the probability of each same selected blur parameter σ similarly to the addition section 162 described hereinabove with reference to FIG. 20.

To the blur amount class determination section 203, more than one combination of the selected blur parameters σ and the addition probabilities are supplied. The blur amount class determination section 203 determines the selected blur parameter σ having the highest addition probability from among the addition probabilities supplied thereto. If the addition probability of the determined selected blur parameter σ is any other than zero, then the blur amount class determination section 203 outputs the selected blur parameter σ as a blur amount class code. On the other hand, if the addition probability of the determined selected blur parameter σ is zero, then the blur amount class determination section 203 outputs a class code of a different class different from the blur amount class code determined from the blur amounts. The addition probability of the determined selected blur parameter σ is zero signifies that there is the possibility that all of the blur parameters σ in the peripheral region of the pixel of interest may be influenced by noise.

Since a flat place in an image exhibits no variation a process of whatever class is applied to the same, no problem occurs even if a different class is applied. On the other hand, by carrying out such noise decision as described above, the detection accuracy of a blur amount at a place any other than a flat place can be raised.

Figure 24:
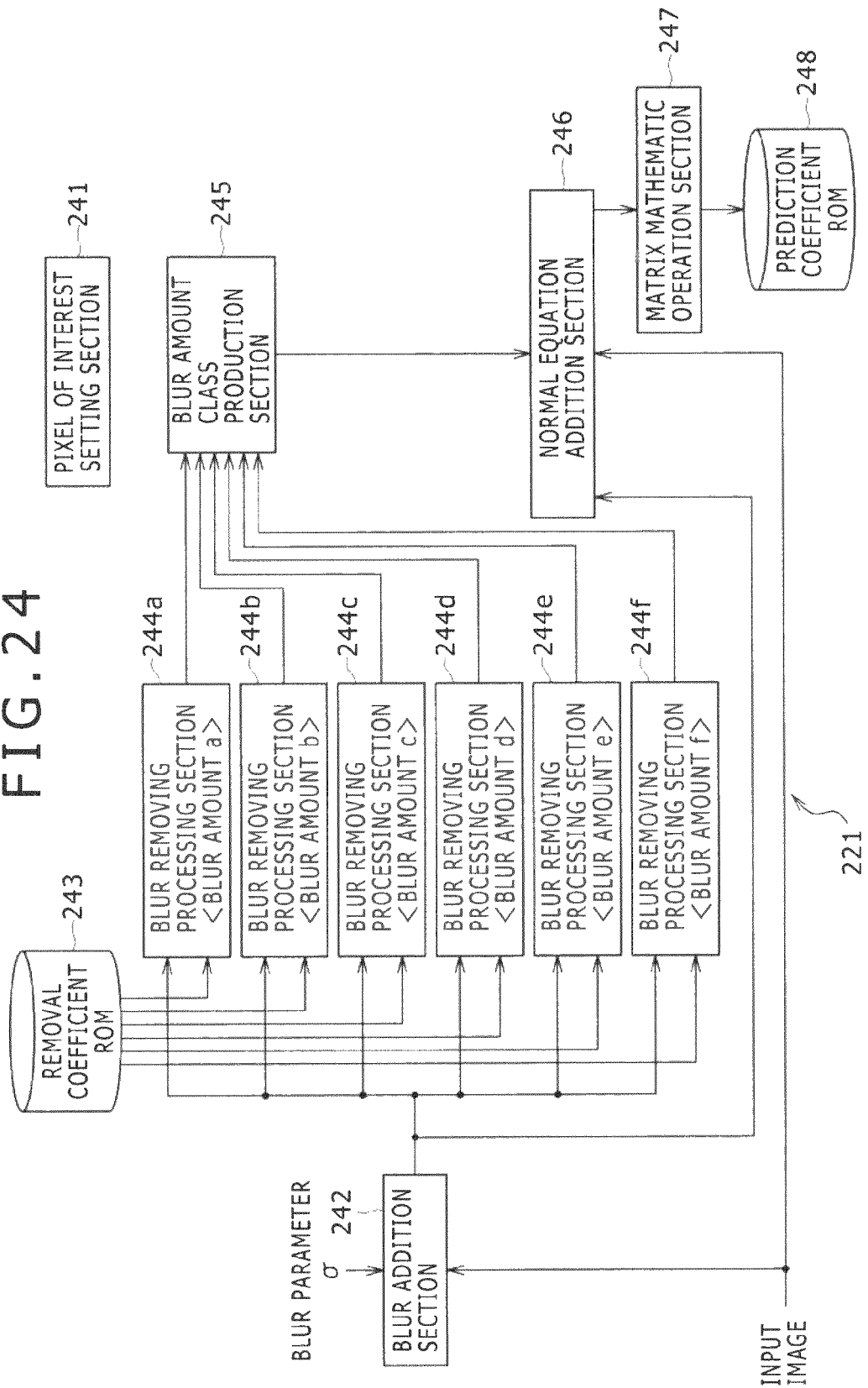
FIG. 24 is a block diagram showing an example of a configuration of a prediction coefficient learning apparatus which learns a prediction coefficient.

FIG. 24 shows an example of a configuration of a prediction coefficient learning apparatus 221 which learns a prediction coefficient for each blur amount class stored in the prediction coefficient ROM 14 of the image processing apparatus 1 shown in FIG. 1.

Referring to FIG. 24, the prediction coefficient learning apparatus 221 includes a pixel of interest setting section 241, a blur addition section 242, a removal coefficient ROM 243, blur removing processing sections 244a to 244f, a blur amount class production section 245, a normal equation addition section 246, a matrix mathematic operation section 247, and a prediction coefficient ROM 248.

An input image inputted to the prediction coefficient learning apparatus 221 is an image having no blur and is used as a teacher image. The pixel of interest setting section 241 sets pixels of the teacher image successively as a pixel of interest.

The blur addition section 242 carries out convolution mathematic operation represented by the expression (2) given hereinabove to artificially add blur to the input image to produce a blur image and supplies the blur image as a student image to the blur removing processing sections 244a to 244f.

The blur removing processing sections 244a to 244f carry out a process similar to that of the blur removing processing sections 11a to 11f. In particular, the blur removing processing sections 244a to 244f extract (the pixel values of) pixels in a predetermined region with respect to a pixel of interest as a prediction tap and extracts (the pixel values of) the pixels in the predetermined region with respect to the pixel of interest as a class tap. The blur removing processing sections 244a to 244f acquire blur removal coefficients for the blur amounts a to f corresponding to a class code determined from the class tap from the removal coefficient ROM 243 and carries out product sum mathematic operation of the pixel values of the pixels which form the prediction tap and the blur removal coefficients for the blur amounts a to f acquired from the removal coefficient ROM 243 to determine the pixel value of the pixel of interest when the blur of the blur amounts a to f is removed.

The blur amounts removed by the blur removing processing sections 244a to 244f and the blur removal coefficients stored in the removal coefficient database 243 are same as those of the blur removing processing sections 11a to 11f and the removal coefficient ROM 14 shown in FIG. 1, respectively.

The blur amount class production section 245 uses the blur removal images supplied from the blur removing processing sections 244a to 244f to classify the blur amount of the pixel of interest into a predetermined class similarly to the blur amount class production section 13 described hereinabove with reference to FIG. 1 and supplies a blur amount class code obtained by the classification to the normal equation addition section 246. Accordingly, also the blur amount class production section 245 can adopt any of the configurations of the first to third forms described hereinabove.

The normal equation addition section 246 determines a predetermined region of a pixel corresponding to the pixel of interest of the student image as a prediction tap range and determines the pixels included in the prediction tap range as prediction taps.

The normal equation addition section 246 uses, for each class corresponding to the blur amount class code supplied from the blur amount class production section 245, the prediction tap or student image $x_{n,k}$ to carry out mathematic operation corresponding to multiplication $(x_{n,k}x_{n',k})$ of student images of the left side matrix of the expression (10) and summation (Σ).

Further, the normal equation addition section 246 uses the prediction tap or student image $x_{n,k}$ and the teacher image $y_k$ for each class corresponding to a blur amount class code supplied from the blur amount class production section 245 to carry out mathematic operation corresponding to multiplication $(x_{n,k}y_k)$ of the student image $x_{n,k}$ and the teacher image $y_k$ and the summation (Σ) in the spectrum of the expression (10).

In particular, into a memory (not shown) built in the normal equation addition section 246, a component $(\Sigma x_{n,k}x_{n',k})$ of the matrix on the left side and a component $(\Sigma x_{n,k}y_k)$ of the vector on the right side in the expression (10) determined with regard to the teacher image of the pixel of interest are stored into the preceding operation cycle. Thus, the normal equation addition section 246 carries out addition represented by the summation of the expression (10) wherein, to the component $(\Sigma x_{n,k}x_{n',k})$ of the matrix or the component $(\Sigma x_{n,k}y_k)$ of the vector, a corresponding component $(x_{n,k+1}x_{n',k+1})$ or $(x_{n,k+1}y_{k+1})$ calculated regarding a teacher image determined newly as a pixel of interest using this teacher image $y_{k+1}$ or student image $x_{n,k+1}$ is added.

Then, the normal equation addition section 246 carries out such addition as described above determining all of the pixels of the teacher image as a pixel of interest to set up a normal equation represented by the expression (8) for each class.

Then, the normal equation addition section 246 supplies the normal equations to the matrix mathematic operation section 247.

The matrix mathematic operation section 247 solves the normal equations for the classes supplied from the normal equation addition section 246 to determine an optimum prediction coefficient $w_n$ for each of the classes of the blur amount class code and outputs the determined prediction coefficients $w_n$ to the prediction coefficient ROM 248. The prediction coefficient ROM 248 stores the prediction coefficients $w_n$ supplied from the matrix mathematic operation section 247. The prediction coefficients $w_n$ are stored in the prediction coefficient ROM 14 of the image processing apparatus 1 of FIG. 1. It is to be noted that the prediction coefficients outputted from the matrix mathematic operation section 247 may alternatively be stored directly into the prediction coefficient ROM 14 of the image processing apparatus 1.

While the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs.

Figure 25:
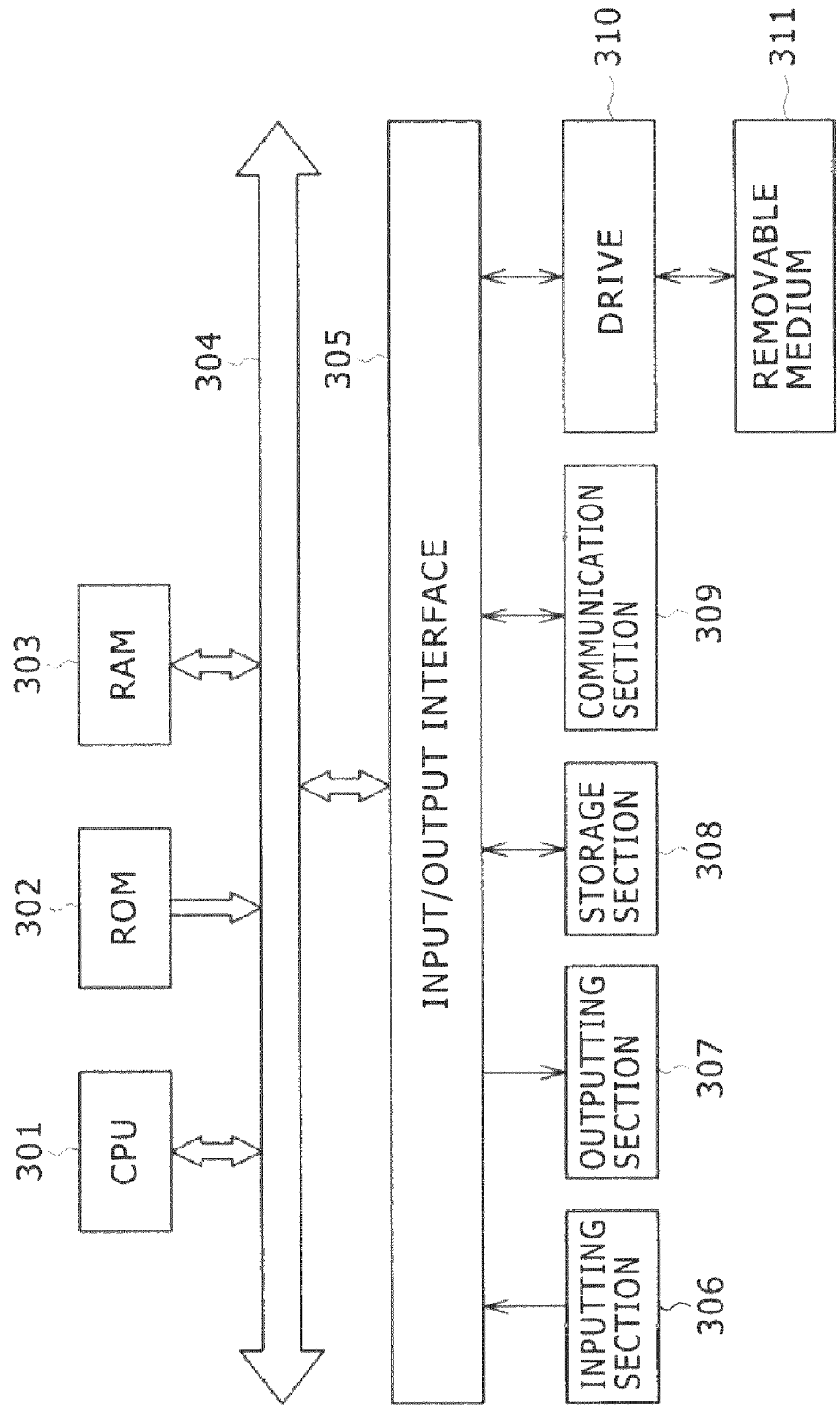
FIG. 25 is a block diagram showing an example of a configuration of a computer to which the present invention is applied.

FIG. 25 shows an example of a hardware configuration of a computer which executes the series of processes described hereinabove in accordance with a program.

Referring to FIG. 25, in the computer shown, a CPU (Central Processing Unit) 301, a ROM (Read Only Memory) 302 and a RAM (Random Access Memory) 303 are connected to each other by a bus 304.

Further, an input/output interface 305 is connected to the bus 304. An inputting section 306 including a keyboard, a mouse, a microphone and so forth, an outputting section 307 including a display unit, a speaker and so forth, a storage section 308 formed from a hard disk, a nonvolatile memory or the like, a communication section 309 including a network interface and so forth, and a drive 310 for driving a removable medium 311 such as a magnetic disk, an optical disk, a magneto-optical disk or a semiconductor memory are connected to the input/output interface 305.

In the computer configured in such a manner as described above, the CPU 301 loads a program stored, for example, in the storage section 308 into the RAM 303 through the input/output interface 305 and the bus 304 and then executes the program to carry out the series of processes described above.

The program to be executed by the CPU 301 is, for example, recorded in and provided together with the removable medium 311 in the form of a package medium formed from such as, for example, a magnetic disk (including a flexible disk), an optical disk (including a CD-ROM (Compact Disk-Read Only Memory) and a DVD (Digital Versatile Disk)), a magneto-optical disk, or a semiconductor memory or provided through a wired or wireless transmission medium such as a local area network, the Internet or digital broadcasting.

The program can be installed into the storage section 308 through the input/output interface 305 by loading the removable medium 311 into the drive 310. Or, the program can be received by the communication section 309 through a wired or wireless transmission medium and installed into the storage section 308. Or else, it is possible to install the program in the ROM 302 or the storage section 308 in advance.

It is to be noted that the program to be executed by the computer may be of a type wherein processes are executed in a time series in the order as described in the present specification or of another type wherein processes are executed in parallel or executed at a necessary timing such as when it is called.

Effects of the image process by the image processing apparatus 1 to which the present invention is applied are described with reference to FIGS. 26 to 28.

Figure 26:

FIG. 26 shows an input image inputted to the image processing apparatus 1 and including a picked up image of a flower as a principal image pickup object. Referring to FIG. 26, the input image shown generally includes, as the distance between an image pickup object and the camera, three distances including a first distance from the camera to the flower, a second distance from the camera to the background of the flower and a third distance from the camera to a leaf on the left side of the flower. The input image is focused on the background of the flower at the second distance.

A processed image when the same blur removing process is applied to the overall range of the input image of FIG. 26 using a related-art blur removing process is shown in FIG. 27. It is to be noted that the blur amount to be removed is manually set by the user so that the blur of the flower may be removed. In the processed image of FIG. 27, although the blur is removed from the image portion of the flower, the image portion of the background of the flower on which the processed image is originally focused is excessively emphasized and looks unnatural because of appearance of ringing.

FIG. 28 shows a processed image when the input image of FIG. 26 is subjected to the blur removing process by the image processing apparatus 1.

By the image processing apparatus 1, an optimum blur amount is selected for each of the image portion of the flower at the first distance, the image portion of the background of the flower at the second distance and the image portion of the leaf on the left side of the flower at the third distance, and a blur removing process of removing the optimum blur amounts is carried out. Therefore, in the processed image of FIG. 28, blur is removed over the overall area. For example, also at the image portion of the background of the flower on which the input image is originally focused, such excessive ringing as seen in FIG. 27 does not appear.

In this manner, the image processing apparatus 1 can optimally remove blur which is caused by a plurality of image pickup objects at different distances included in an image and has a blur amount different among different pixels. Further, with the image processing apparatus 1, the user need not carry out such a special operation as to select an optimum coefficient for blur removal in accordance with the blur amount, that is, need not carry out adjustment for blur removal.

It is to be noted that the input image to be inputted to the image processing apparatus 1 may be any of still pictures and moving pictures.

The image process of the image processing apparatus 1 uses a process, that is, a classification adaptive process, which determines (the pixel value of) a pixel of interest by product sum mathematic operation using a prediction coefficient of a class, that is, a class represented by a blur amount class code, obtained by classifying (the pixel value of) a pixel of interest into one of a plurality of classes and (the pixel value of) pixels of an input image selected with respect to the pixel of interest. Therefore, even if a detection miss of a blur amount class occurs, an extreme failure does not occur. Further, also an image which includes a deterioration factor other than an out-of-focus state such as, for example, motion blur or noise does not suffer from a significant failure and can be coped with robustly.

It is to be noted that, in the present specification, the steps which describe the program recorded in or on a recording medium may be but not necessarily be processed in a time series in the order as described, and include processes which are executed parallelly or individually without being processed in a time series.

While a preferred embodiment of the present invention has been described using specific terms, such description is for illustrative purposes only, and it is to be understood that changes and variations may be made without departing from the spirit or scope of the following claims.

What is claimed is:

1. An image processing apparatus comprising:
    blur removing processing means for carrying out a blur removing process for an input image using a plurality of blur removal coefficients for removing blur of a plurality of different blur amounts to produce a plurality of different blur removal result images;
    feature detection means for detecting a feature from each of the different blur removal result images;
    blur amount class determination means for determining blur amount classes representative of classes of the blur amounts from the features; and
    prediction processing means for carrying out mathematic operation of pixel values of predetermined pixels of the input image and prediction coefficients learned in advance and corresponding to the blur amount classes to produce an output image from which the blur is removed.

2. The image processing apparatus according to claim 1, wherein
    said blur amount class determination means includes
        blur amount generation probability storage means for detecting features from the plural different blur removal result images obtained by removing, from blur images obtained by adding blur of the plural different blur amounts to the input image, the blur using the plural different blur removal coefficients to detect a frequency distribution of the features regarding each of the plural different blur amounts in advance and storing, for each feature, a probability distribution representative of generation probabilities of the blur amounts,
    said blur amount class determination means determining that one of the blur amounts which exhibits the highest generation probability as a blur amount class from the probability distributions stored in said blur amount generation probability storage means with regard to the features detected by said feature detection means.

3. The image processing apparatus according to claim 2, wherein
    said feature detection means detects the features regarding each of a pixel of each of the blur removal result images corresponding to a pixel of interest and peripheral pixels around the pixel of interest, and
    said blur amount class determination means adds the generation probability of the blur amount corresponding to each of the features detected by said feature detection means among the same blur amounts and determines a blur amount class corresponding to the pixel of interest from a result of the addition.

4. The image processing apparatus according to claim 3, wherein
    said blur amount class determination means further includes
        noise information storage means for detecting in advance the features from the plural different blur removal result images obtained by removing, from a noise addition image obtained by adding noise to a flat image, the blur using the plural blur removal coefficients to store information representative of the generation probabilities of the features by the noise, and
    said blur amount class determination means does not carry out the addition of the generation probability of the blur amount of the feature which is generated with high possibility by the noise from among the features of the pixel of interest and the peripheral pixels around the pixel of interest.

5. The image processing apparatus according to claim 1, wherein
    said feature detection means compares the pixel value and the threshold value of a pixel of each of the blur removal result images corresponding to a pixel of interest and a plurality of pixels in a particular region around the pixel corresponding to the pixel of interest with each other, and detects a feature for each of the blur amounts in response to a result of the comparison, and
    said blur amount class determination means determines a blur amount class in response to a result of the detection of said feature detection means.

6. The image processing apparatus according to claim 1, wherein:
    said feature detection means includes
        first image characteristic detection means for detecting a first image characteristic from a pixel of the input image corresponding to a pixel of interest and peripheral pixels around the pixel of interest, and
        second image characteristic detection means for detecting a second image characteristic from a pixel of each of the blur removal result images corresponding to the pixel of interest and peripheral pixels around the pixel of interest; and
    said blur amount class determination means includes
        feature property value storage means for classifying a plurality of images in a unit of a pixel with the first image characteristic and detecting and storing a property value of the second image characteristic for each of the first image characteristics;
    said blur amount class determination means acquiring the property value of the second image characteristic corresponding to the first image characteristic detected by said first image characteristic detection means from said feature property value storage means, whereafter said blur amount class determination means compares the second image characteristic detected by said second image characteristic detection means and the acquired property value with each other to determine a blur amount class.

7. An image processing method, comprising the steps of:
    carrying out a blur removing process for an input image using a plurality of blur removal coefficients for removing blur of a plurality of different blur amounts to produce a plurality of different blur removal result images;
    detecting a feature from each of the different blur removal result images;
    determining blur amount classes representative of classes of the blur amounts from the features; and
    carrying out mathematic operation of pixel values of predetermined pixels of the input image and prediction coefficients learned in advance and corresponding to the blur amount classes to produce an output image from which the blur is removed.

8. A program stored in non-transitory computer readable medium for causing a computer to execute an image process comprising the steps of:

carrying out a blur removing process for an input image using a plurality of blur removal coefficients for removing blur of a plurality of different blur amounts to produce a plurality of different blur removal result images;

detecting a feature from each of the different blur removal result images;

determining blur amount classes representative of classes of the blur amounts from the features; and carrying out mathematic operation of pixel values of predetermined pixels of the input image and prediction coefficients learned in advance and corresponding to the blur amount classes to produce an output image from which the blur is removed.

9. A learning apparatus for learning a prediction coefficient used for an image processing apparatus which removes blur of an image, comprising:

blur addition means for adding blur to an input image inputted as a teacher image and having no blur to produce a student image;

blur removing processing means for carrying out a blur removing process for the student image using a plurality of blur removal coefficients for removing blur of a plurality of different blur amounts to produce a plurality of different blur removal result images;

feature detection means for detecting a feature from each of the different blur removal result images;

blur amount class determination means for determining blur amount classes representative of classes of the blur amounts from the features; and prediction processing means for carrying out mathematic operation of pixel values of predetermined pixels of the student image and the teacher image and prediction coefficients learned in advance and corresponding to the blur amount classes to produce an output image from which the blur is removed.

10. The learning apparatus according to claim 9, wherein said blur amount class determination means includes blur amount generation probability storage means for detecting features from the plural different blur removal result images obtained by removing, from blur images obtained by adding blur of the plural different blur amounts to the input image, the blur using the plural different blur removal coefficients to detect a frequency distribution of the features regarding each of the plural different blur amounts in advance and storing, for each feature, a probability distribution representative of generation probabilities of the blur amounts, said blur amount class determination means determining that one of the blur amounts which exhibits the highest generation probability as a blur amount class from the probability distributions stored in said blur amount generation probability storage means with regard to the features detected by said feature detection means.

11. The learning apparatus according to claim 10, wherein said feature detection means detects the features regarding each of a pixel of each of the blur removal result images corresponding to a pixel of interest and peripheral pixels around the pixel of interest, and said blur amount class determination means adds the generation probability of the blur amount corresponding to each of the features detected by said feature detection means among the same blur amounts and determines a blur amount class corresponding to the pixel of interest from a result of the addition.

12. A learning apparatus according to claim 11, wherein: said blur amount class determination means further includes noise information storage means for detecting in advance the features from the plural different blur removal result images obtained by removing, from a noise addition image obtained by adding noise to a flat image, the blur using the plural blur removal coefficients to store information representative of the generation probabilities of the features by the noise; and said blur amount class determination means does not carry out the addition of the generation probability of the blur amount of the feature which is generated with high possibility by the noise from among the features of the pixel of interest and the peripheral pixels around the pixel of interest.

13. The learning apparatus according to claim 9, wherein said feature detection means compares the pixel value and the threshold value of a pixel of each of the blur removal result images corresponding to a pixel of interest and a plurality of pixels in a particular region around the pixel corresponding to the pixel of interest with each other, and detects a feature for each of the blur amounts in response to a result of the comparison, and said blur amount class determination means determines a blur amount class in response to a result of the detection of said feature detection means.

14. The learning apparatus according to claim 9, wherein: said feature detection means includes first image characteristic detection means for detecting a first image characteristic from a pixel of the input image corresponding to a pixel of interest and peripheral pixels around the pixel of interest, and second image characteristic detection means for detecting a second image characteristic from a pixel of each of the blur removal result images corresponding to the pixel of interest and peripheral pixels around the pixel of interest; and said blur amount class determination means includes feature property value storage means for classifying a plurality of images in a unit of a pixel with the first image characteristic and detecting and storing a property value of the second image characteristic for each of the first image characteristics;

said blur amount class determination means acquiring the property value of the second image characteristic corresponding to the first image characteristic detected by said first image characteristic detection means from said feature property value storage means, whereafter said blur amount class determination means compares the second image characteristic detected by said second image characteristic detection means and the acquired property value with each other to determine a blur amount class.

15. An image processing apparatus comprising:

a blur removing processing section configured to carry out a blur removing process for an input image using a plurality of blur removal coefficients for removing blur of a plurality of different blur amounts to produce a plurality of different blur removal result images;

a feature detection section configured to detect a feature from each of the different blur removal result images;

a blur amount class determination section configured to determine blur amount classes representative of classes of the blur amounts from the features; and a prediction processing section configured to carry out mathematic operation of prediction coefficients learned in advance and corresponding to the blur amount classes and pixel values of predetermined pixels of the input image to produce an output image from which the blur is removed.

16. A learning apparatus for learning a prediction coefficient used for an image processing apparatus which removes blur of an image, comprising:

a blur addition section configured to add blur to an input image inputted as a teacher image and having no blur to produce a student image;

a blur removing processing section configured to carry out a blur removing process for the student image using a plurality of blur removal coefficients for removing blur of a plurality of different blur amounts to produce a plurality of different blur removal result images;

a feature detection section configured to detect a feature from each of the different blur removal result images;

a blur amount class determination section configured to determine blur amount classes representative of classes of the blur amounts from the features; and prediction processing section configured to carry out mathematic operation of pixel values of predetermined pixels of the student image and the teacher image and prediction coefficients learned in advance and corresponding to the blur amount classes to produce an output image from which the blur is removed.

* * * * *